United States Patent
Alasia et al.

(10) Patent No.: US 7,421,581 B2
(45) Date of Patent: Sep. 2, 2008

(54) METHOD AND SYSTEM FOR CONTROLLING ENCODED IMAGE PRODUCTION

(75) Inventors: Alfred V. Alasia, Lake Worth, FL (US); Alfred J. Alasia, Royal Palm Beach, FL (US); Thomas C. Alasia, Lake Worth, FL (US); Slobodan Cvetkovic, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 782 days.

(21) Appl. No.: 10/847,962

(22) Filed: May 18, 2004

(65) Prior Publication Data

US 2005/0188205 A1    Aug. 25, 2005

Related U.S. Application Data

(60) Provisional application No. 60/507,410, filed on Sep. 30, 2003, provisional application No. 60/510,854, filed on Oct. 14, 2003, provisional application No. 60/565,300, filed on Apr. 26, 2004.

(51) Int. Cl.
*H04L 9/00* (2006.01)
(52) U.S. Cl. .................. 713/168; 713/150; 713/170
(58) Field of Classification Search ............... 382/100; 713/168, 150, 170
See application file for complete search history.

(56) References Cited

U.S. PATENT DOCUMENTS 3,524,395 A    8/1970    Alasia (Continued)

FOREIGN PATENT DOCUMENTS

DE    101 17 038 A1    1/2002

(Continued)

OTHER PUBLICATIONS

AU: Sabrina De Capitani di Vimercati, Stefano Paraboschi, Pierangela Samarati; TI: Access control: principles and solutions; SO: Software: Practice and Experience; VL: 33; No. 5; p. 397-421; YR: 2003 CP: Copyright © 2003 John Wiley & Sons, Ltd.*

(Continued)

*Primary Examiner*—David Y Jung
(74) *Attorney, Agent, or Firm*—Hunton & Williams LLP

(57) ABSTRACT

An automated method of producing encoded images for incorporation into a digital document is provided. The method comprises receiving a request from a user to produce an encoded image. The request includes user-supplied data for producing the encoded image, the user-supplied data including user-supplied authentication indicia and/or at least one user-supplied encoding parameter. The method further comprises determining whether the user is authorized to produce an encoded image using the user-supplied data. Responsive to a determination that the user is authorized to produce an encoded image using the user-supplied data, encoding actions are carried out. The encoding actions include establishing at least one digitized authentication image and establishing an encoding parameter set including any user-supplied encoding parameters. The encoding parameter set is usable to encode one or more of the at least one digitized authentication image. The encoding actions also include encoding one or more of the at least one digitized authentication image using the encoding parameter set to produce a final encoded image.

51 Claims, 15 Drawing Sheets

U.S. PATENT DOCUMENTS

| | | | |
|---|---|---|---|
| 3,635,778 A | 1/1972 | Rice et al. |
| 3,642,346 A | 2/1972 | Dittmar |
| 3,784,289 A | 1/1974 | Wicker |
| 3,937,565 A | 2/1976 | Alasia |
| 4,092,654 A | 5/1978 | Alasia |
| 4,198,147 A | 4/1980 | Alasia |
| 4,303,307 A | 12/1981 | Tureck et al. |
| 4,715,623 A | 12/1987 | Roule et al. |
| 4,914,700 A | 4/1990 | Alasia |
| 5,027,401 A | 6/1991 | Soltesz |
| 5,113,213 A | 5/1992 | Sandor et al. |
| 5,178,418 A | 1/1993 | Merry et al. |
| 5,195,435 A | 3/1993 | Morrone et al. |
| 5,303,370 A | 4/1994 | Brosh et al. |
| 5,396,559 A | 3/1995 | McGraw |
| 5,438,429 A | 8/1995 | Haeberli et al. |
| 5,708,717 A | 1/1998 | Alasia |
| 5,735,547 A | 4/1998 | Morelle et al. |
| 5,830,609 A | 11/1998 | Warner et al. |
| 5,904,375 A | 5/1999 | Brugada |
| 5,974,150 A | 10/1999 | Kaish et al. |
| 6,084,713 A | 7/2000 | Rosenthal |
| 6,104,812 A | 8/2000 | Koltai et al. |
| 6,171,734 B1 | 1/2001 | Warner et al. |
| 6,222,650 B1 | 4/2001 | Long |
| 6,252,963 B1 | 6/2001 | Rhoads |
| 6,256,150 B1 | 7/2001 | Rosenthal |
| 6,280,891 B2 | 8/2001 | Daniel et al. |
| 6,343,138 B1 | 1/2002 | Rhoads |
| 6,389,151 B1 * | 5/2002 | Carr et al. | 382/100 |
| 6,414,794 B1 | 7/2002 | Rosenthal |
| 2001/0005570 A1 | 6/2001 | Daniel et al. |
| 2002/0008380 A1 | 1/2002 | Taylor et al. |
| 2002/0185857 A1 | 12/2002 | Taylor et al. |
| 2003/0012562 A1 | 1/2003 | Lawandy et al. |
| 2003/0015866 A1 | 1/2003 | Cioffi et al. |
| 2003/0137145 A1 | 7/2003 | Fell et al. |

FOREIGN PATENT DOCUMENTS

| | | |
|---|---|---|
| EP | 0598357 B1 | 5/1994 |
| EP | 1147912 A2 | 10/2001 |
| GB | 1407065 | 9/1975 |
| WO | WO 92/04692 | 3/1992 |
| WO | WO 93/15491 | 8/1993 |
| WO | WO 94/07326 | 3/1994 |
| WO | WO 97/20298 | 6/1997 |
| WO | WO 98/15418 | 4/1998 |
| WO | WO 01/80512 | 10/2001 |
| WO | WO 01/87632 A1 | 11/2001 |

OTHER PUBLICATIONS

Design of an efficient authentication method for modern image and video Skraparlis, D.; Consumer Electronics, IEEE Transactions on vol. 49, Issue 2, May 2003 pp. 417-426.*

Watermarking JBIG2 text region for image authentication Pamboukian, S.V.D.; Hae Yong Kim; de Queiroz, R.L.; Image Processing, 2005. ICIP 2005. IEEE International Conference on vol. 2, Sep. 11-14, 2005 pp. II-1078-II-1081.*

Image Authentication Based on Distributed Source Coding Yao-Chung Lin; Varodayan, D.; Girod, B.; Image Processing, 2007. ICIP 2007. IEEE International Conference on vol. 3, Sep. 16-Oct. 19, 2007 pp. III-5-III-8.*

Supplementary European Search Report, EP 04 78 4419, mailed Feb. 7, 2008, 3 pages.

* cited by examiner

METHOD AND SYSTEM FOR CONTROLLING ENCODED IMAGE PRODUCTION

RELATED APPLICATIONS

This application claims priority to U.S. Provisional Application No. 60/507,410, filed Sep. 30, 2003, U.S. Provisional Application No. 60/510,854, filed Oct. 14, 2003 and U.S. Provisional Application No. 60/565,300, filed Apr. 26, 2004, the disclosures of which are incorporated herein by reference in their entirety.

FIELD OF THE INVENTION

The invention relates generally to the field of counterfeit protection, and more particularly to the field of electronic and printed document protection through the use of an encoded image.

BACKGROUND OF THE INVENTION

An emerging trend in the increasingly electronic business world is using the world wide web and email to provide up-to-the-minute business documents to customers and other end users. Automated document generation and electronic distribution, such as using email or web services has many advantages. It significantly reduces costs associated with pre-printing forms, document archiving, mailing, handling etc. It gives line-of-business users access to important data instantly and makes documents available to the customers at all times, around-the-clock. However, certain drawbacks are present with electronic documents, including the potential for tampering or creation of fraudulent documents that in most or all aspects resemble the original.

Many software tools have been suggested to protect the integrity and confidentiality of electronic documents. These tools, such as plug-ins, may give broad control to adding or changing notes and form fields in the electronic document, document encryption, as well as adding digital signatures to the documents.

A significant drawback in the protective measures typically used to protect documents provided in electronic format is that these measures are often useless once the document is transferred to a printed media. Further, typical hard copy protective measures may not be available to the recipient of the electronic document. For example, security ink or secure paper may be available to the document creator but not to the recipient of an electronically transmitted document. Clearly, maintaining the security of hard copies of electronically transmitted copies is problematic when the document creator has no control over the printing process. Furthermore, many desktop image-editing software tools can be used to create counterfeit print-outs of even complex electronic documents. Printed documents are still widely used in many aspects of daily life, including business and government settings.

Widely used protection methods for deterring digital counterfeiting and identifying data alterations include bar codes and digital watermarking. These are usually added as an image file into a document by the originating party. However, bar-code generation software is widely available and can be used by a counterfeiter to create fraudulent documents.

Digital watermarking has also been proposed as a solution, but tests have shown that it may lack the reliability necessary for consistent and widespread use. Further, implementing such technology is often expensive, with equipment costs for the necessary hardware and software sometimes canceling the cost savings achieved through electronic document distribution. The amount of information that can be protected may often be limited to just several digits or letters. These problems put a severe constraint on reliability and usage of electronic documents in commerce and services.

SUMMARY OF THE INVENTION

Accordingly, there is a need to provide a method of protecting documents in electronic form that maintains resistance to counterfeiting after the document has been printed. Further, it is highly desirable to provide a protection methodology that provides levels and degrees of protection based on a combination of data that is within the control of the document generator or user and data that is not within the control of the document generator or user.

An aspect of the invention provides an automated method of producing encoded images for incorporation into a digital document. The method comprises receiving a request from a user to produce an encoded image. The request includes user-supplied data for producing the encoded image, the user-supplied data including user-supplied authentication indicia and/or at least one user-supplied encoding parameter. The method further comprises determining whether the user is authorized to produce an encoded image using the user-supplied data. Responsive to a determination that the user is authorized to produce an encoded image using the user-supplied data, encoding actions are carried out. The encoding actions include establishing at least one digitized authentication image and establishing an encoding parameter set including any user-supplied encoding parameters. The encoding parameter set is usable to encode one or more of the at least one digitized authentication image. The encoding actions also include encoding one or more of the at least one digitized authentication image using the encoding parameter set to produce a final encoded image.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
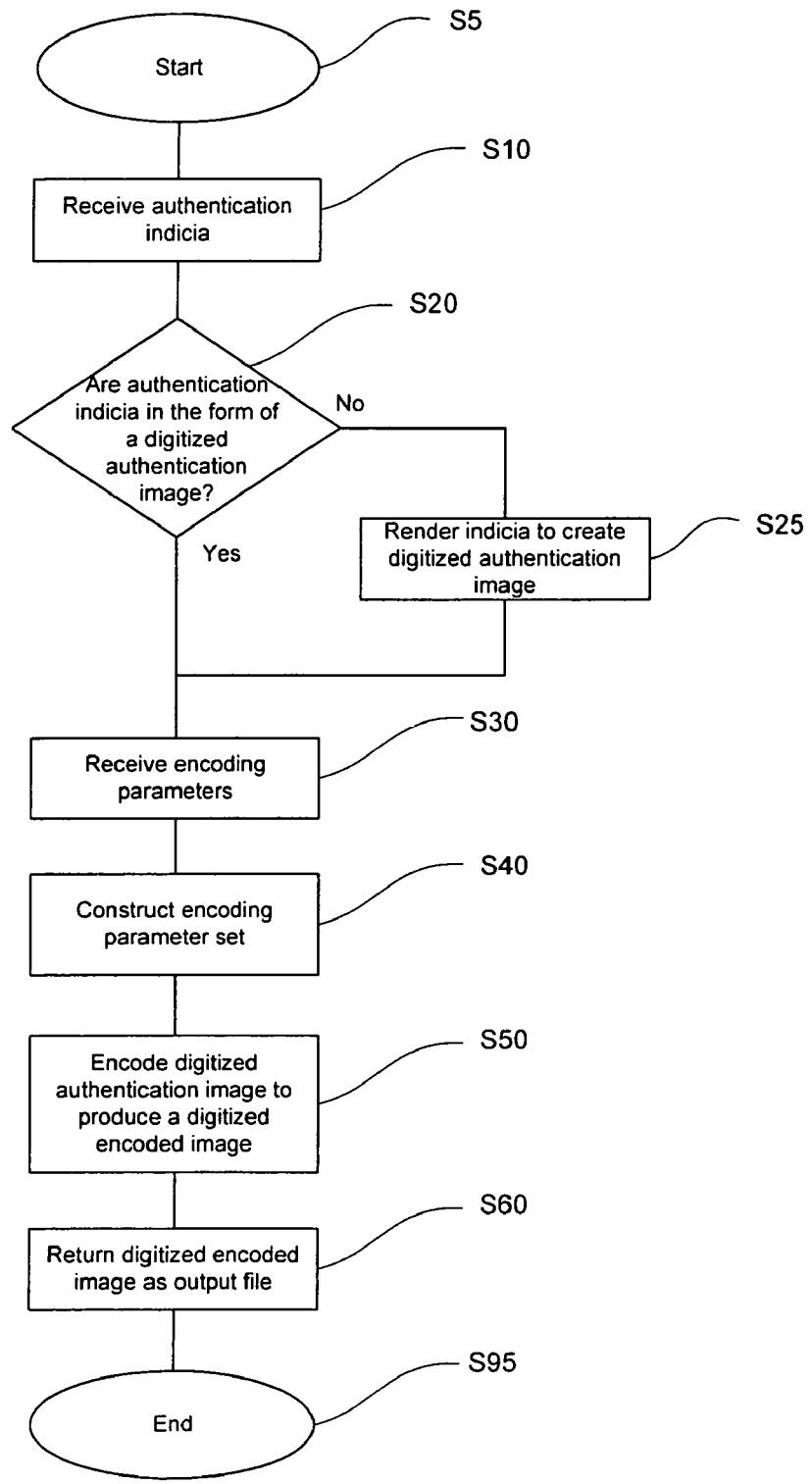
FIG. 1 is a flowchart for a method of producing an encoded image for authenticating a document according to an exemplary embodiment of the invention.

Embodiments of the present invention provide methods for the protection of documents using one or more encoded images that may be embedded in a background or source image or otherwise incorporated into the documents being protected. The systems and methods of the invention are related to those described in co-pending U.S. application Ser. No. 10/847,943, filed May 18, 2004, which is incorporated herein by reference in its entirety.

As used herein, the term "encoded image" refers to a rasterized, scrambled or other manipulated variation of one or more authentication images that, when embedded in a document, or in another printed background or source image, cannot be discerned from the base document material or other background or source image without the use of an optical decoding device. An encoded image may be generated from an authentication image using a particular set of characteristics that include encoding parameters corresponding to certain optical characteristics of the decoding device. When the encoded image is printed, placement of the decoding device over the printed encoded image in a predetermined orientation reveals the authentication image. Without the decoding lens, some or all of the encoded image may be visible, but indecipherable or indistinguishable from the background by the naked eye.

One method of producing encoded images is through a rasterization process such as that described in U.S. Pat. No. 5,708,717 (the '717 Patent), which is incorporated herein by reference in its entirety. In the '717 Patent method, digitized authentication images are encoded by rasterizing them according to a series of predetermined encoding parameters. Encoding parameters for this method may include a line frequency, which corresponds to the number and spacing of regular line segments into which an image is divided (rasterized). The size and number of divisions determines the frequency (i.e., number of line segments per inch) of the encoded image. The encoding parameters may also include an angular orientation to define how the authentication images will be oriented relative to the object upon which they are to be printed.

The decoding device of the '717 Patent method may be a lenticular lens having optical characteristics matching those of an encoded image. In particular, the lenticular lens may be formed with a frequency that corresponds to the frequency of the encoded image. When placed over the encoded image and rotated to the correct angular orientation, the encoded image is decoded, thereby allowing the authentication image(s) to be viewed.

Although the rasterization methods of the '717 Patent are referred to throughout this specification, it will be understood by those of ordinary skill in the art that any image encoding method having a set of definable image characteristics relatable to a decoding device with corresponding optical characteristics may be used in conjunction with the methods of the present invention.

As discussed above, encoded images are derived from one or more digitized authentication images using a set of encoding parameters. The invention involves the embedding of one or more encoded images into printable documents wherein the various encoding parameters used to generate the encoded images may come from multiple sources. The embedding process may be accomplished through the use of software that produces the encoded images for a user from selected authentication images. In some embodiments of the invention, a single encoded image may be constructed from an encoding parameter set having one or more encoding parameters generated or selected by the user and one or more additional encoding parameters that are generated or selected by a non-user or are selected automatically without user input. In some embodiments, the single encoded image may be constructed from multiple authentication images, each having its own associated encoding parameter set. In these embodiments, some or all of the encoding parameter set for a first authentication image may be selected or generated by the user, while some or all of the encoding parameters for a second authentication image may be selected or generated by a non-user or selected automatically without user input.

An aspect of the invention provides for establishing the characteristics of an encoded image so as to be unique for a particular document. This may be accomplished by selectively specifying unique authentication images or encoding parameters for the encoded image or by having such characteristics generated automatically in such as way as to uniquely associate them with the generation of a new document or with a particular modification of a previously generated document. As will be discussed, the characteristics that may be varied include encoding parameters such as, for example, the line frequency of a rasterized image, the angle of a particular authentication image when viewed through a decoder or the decoding angle of the encoded image (i.e., the angle with respect to a specified frame of reference at which a decoder must be placed in order to view the authentication image). The unique encoded image characteristics may also include the content of the authentication image, which may, for example, include text generated to identify circumstances relating to document generation.

As will be discussed, some embodiments of the invention provide for the use of an encoded image based on multiple encoded images, some of which may have associated characteristics that are unique to a particular document and some of which are not. As noted above, some methods of the invention provide for user input into the generation of some but not all of the characteristics of the encoded images applied to a particular document. In some embodiments, the user may have control of some aspects of the document authentication method and not others. The user may, for example, be empowered to control the authentication images themselves but not the other encoding characteristics or parameters.

The methods of the invention may be used in conjunction with the construction or modification of documents produced by virtually any document processing or graphics software. They may be adapted for use in a standalone software program for operating on documents generated by other document processing software. Alternatively, they may be adapted for use in software subroutines that may be integrated into document generation programs, such as, for example, Microsoft Word or Adobe Acrobat. The input to the software program or subroutine may include some or all of a document to be authenticated and one or more encoding parameters. One or more authentication images may also be included as input. The output may be a file containing one or more digitized encoded images. The output file may be stored in memory and a user may insert the file into the document. Alternatively, the output file may include all or a portion of the document with one or more digitized encoded images already embedded therein In either case, when the document is printed, the encoded images are printed along with the document.

As used herein, the term "document" is meant to encompass all forms of documents, both printed and electronic. In this manner, the described method may be used to protect a document created electronically, and continues to protect that document after it has been printed. The printed document is protected by making the document resistant to tampering, to unauthorized duplication, and to other forms of alteration, forgery, or fraud.

FIG. 1 is a flow chart of a method of producing an encoded image according to an embodiment of the invention. In this method, which may be implemented as a document authentication software program or as a subroutine, a single set of authentication indicia is used to produce a single encoded image using a set of encoding parameters assembled from user-supplied parameters and non-user-supplied parameters. The method begins at S5. At S10, authentication indicia are received. Authentication indicia are representations of the visual image or text that will be produced when the printed encoded image is decoded. The authentication indicia may be a digitized form of any visual representation including but not limited to digitized images, computer-generated graphics and text strings from document processing programs. Thus, the authentication indicia may be in the form of an image file or any other data capable of being represented digitally that may be desirable for use in authenticating a document.

Authentication indicia may be selected so as to provide information about the source of a document or about the user. For example, authentication indicia may include an image of a corporate logo or textual identification of a government agency. Alternatively, or in addition, authentication indicia may include information relating to the document to be authenticated. This may include general information that would be applicable to any document of a particular type or purpose or may be specific to a particular document. Authentication indicia for a specific document could, for example, include text from the document itself, or text relating to the circumstances of the generation of the document. Authentication indicia may also include a textual representation of the circumstances relating to the current authentication process. If, for example, the authentication method is carried out at the time of printing of a particular document, the authentication indicia could include a textual representation of a time and date to be associated with the document. Alternatively, or in addition, the authentication indicia may include information relating to a processor or station at which the document is generated, processed or printed.

From the above, it will be understood by those of ordinary skill in the art, that authentication indicia may be made unique to a particular document or document type or may be generic to a particular user. In yet another alternative, the authentication indicia may be established by a licensor or provider of the authentication software with or without input from the user.

The authentication indicia may be received as input from a user or may be received from a non-user source. User input may be supplied interactively or may be supplied and stored for later use by the software. In some embodiments, the user may be offered predetermined authentication indicia alternatives from which a user selection is made. Non-user-supplied authentication indicia may be read from storage or may be determined by an indicia determination module. In some embodiments, non-user supplied authentication indicia may be determined or constructed from user-supplied data, from a document generation circumstance or from the content of the document to be authenticated.

Returning now to FIG. 1, at S20 a determination may be made as to whether the authentication indicia are in the form of a digitized authentication image. If the authentication indicia are or include data (e.g., a text string) in a form other than an image format, the data is rendered into an image format at S25. Rendering may be done by the authentication software code or by a separate module. In either case, the resulting digitized image file need not be displayed to the user.

Encoding parameters are received at S30 and assembled into an encoding parameter set at S40. As previously discussed, encoding parameters are applied to a digitized authentication image to produce a digitized encoded image. The encoding parameters may be used to determine the characteristics of the encoded image and/or the appearance of the authentication image when the encoded image is decoded. The nature of the encoding parameters depends on the encoding methodology used. Examples of encoding parameters for a rasterization method may include resolution or frequency of the encoded image and the orientation at which a decoding lens must be positioned to reveal the authentication image (decoding angle). Another example would be an indicator that would determine a particular type of rasterization. Such a rasterization type parameter may be used to determine, for example, whether an image is to be rasterized using dots, lines, diamonds, elliptical dots, or some other geometric form. Further, each rasterization type may involve specific characteristics that could also be used as encoding parameters. These could include, for example, the degree of elongation of diamonds and elliptical dots, etc. Encoding parameters may also include values relating to the geometry, position and orientation of the authentication image when viewed through the decoder. Encoding parameters could also include such variables as print resolution or a repetition factor or frequency used to generate a wallpaper pattern from the authentication indicia.

Figure 2:
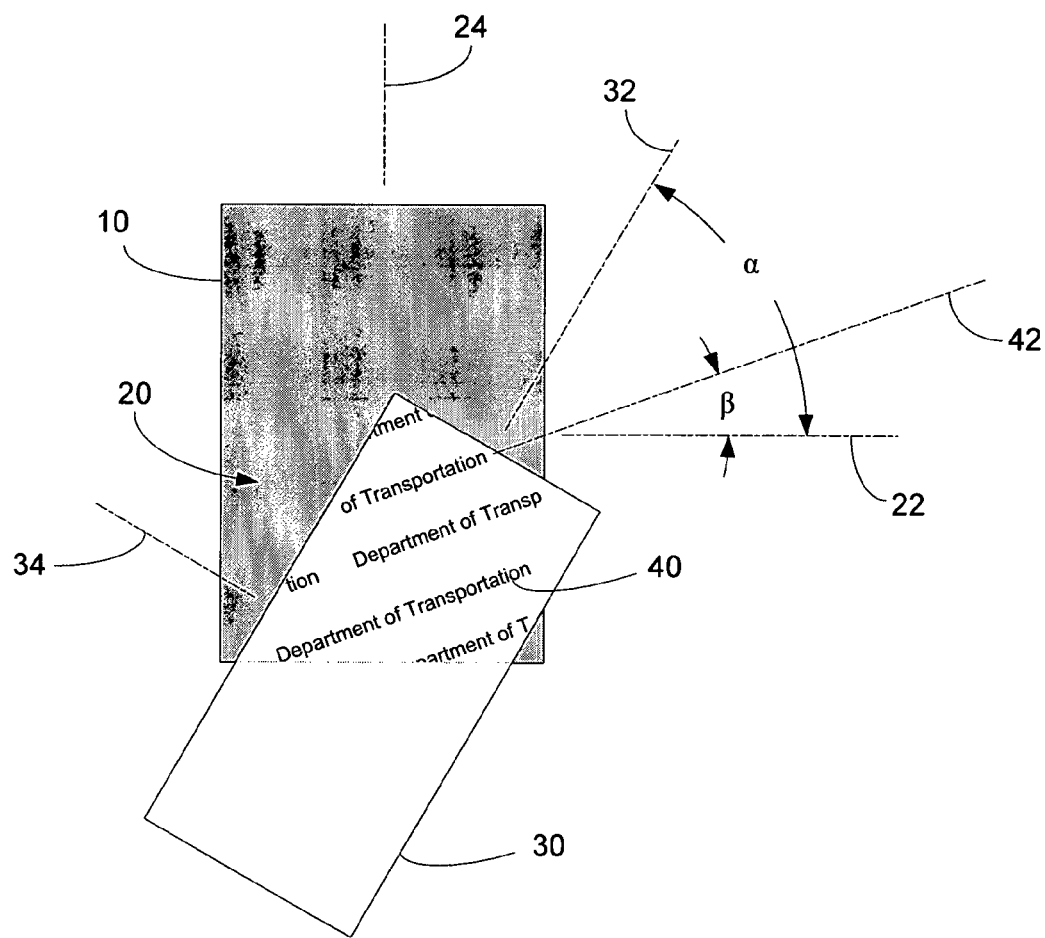
FIG. 2 is an illustration of the use of a decoding device to decode an encoded image produced using a method according to an embodiment of the invention.

FIG. 2 illustrates a decoding lens 30 and an exemplary encoded image 20 applied to a document portion 10. The document portion 10 has horizontal and vertical axes 22, 24 and the decoding lens 30 has first and second orthogonal axes 32, 34. The encoded image 20 was formed from a digitized authentication image comprising the text "Department of Transportation." The encoding parameters used to form the encoded image 20 include the decoding angle α and the authentication image angle β. The decoding angle α may be defined as the angle between the horizontal document portion axis 22 and the first decoding lens axis 32 when the decoding lens 30 is in the correct position for decoding the encoded image 20. The image angle β may be defined as the angle between the horizontal document portion axis 22 and the text orientation line 42 of the authentication image 40 when viewed through the decoding lens 30. It will be understood by those of ordinary skill in the art that the authentication image 40 may be viewable with varying degrees of clarity when the decoding lens 30 is oriented with its horizontal axis 32 within about +/−5 degrees of the decoding angle α. It will also be understood that the decoding angle α and the image angle β may be selected independently of one another.

It will be understood that the angular definitions above are exemplary only and that the actual encoding parameter definitions may vary depending on the document and the needs of the user.

Individual encoding parameters may be user-provided or non-user-provided. User-provided encoding parameters may be supplied by the user interactively or may be supplied and stored for later use by the software. In some embodiments, the user may be offered predetermined authentication encoding parameter alternatives from which a user selection is made. Non-user-provided encoding parameters may be pre-programmed into the software or retrievable from data storage. Non-user-supplied encoding parameters may also be calculated or determined by the software as a function of a processing circumstance or based on a random selection. A processing circumstance could include, for example, the time at which the encoded image is generated or characteristics of the operating environment (e.g., characteristics or identification of the processor generating the document). Such information could be linked by a predetermined relationship to a particular encoding parameter such as the decoding angle. Alternatively, information relating to a processing circumstance or other non-user-supplied information may be introduced into the authentication indicia.

Linking encoding parameters to processing circumstances makes it possible to determine circumstances relating to the processing or printing of a document from the encoded image, even if the text of the encoded image is fixed. This provides an additional layer of authentication by allowing an investigator to verify information found on the face of a printed document. For example, in an encoded image having a decoding angle functionally related to the document date, the investigator would be able to determine the date from the encoded angle and compare it to the date shown on the document.

As noted above, encoding parameters may be user-supplied or non-user-supplied. In a particular authentication method of the invention, the encoding parameter set includes at least one encoding parameter that is non-user-supplied. The non-user-supplied encoding parameter can be a fixed parameter or may be tied to a processing circumstance as described above. Among other things, including an encoding parameter that is not controllable by the user provides protection against misuse by a particular user. The non-user-supplied encoding parameter(s) may be set by a software licensing or control entity or may be set by an administrator of the user's organization. As discussed above, the non-user-supplied encoding parameter(s) may also be constructed by the software without input from the user.

At S50, a digitized encoded image is produced from the digitized authentication image using the encoded parameter set. As discussed above, any method for creating an encoded image from the authentication image may be used, including the method described in the '717 Patent. In that method, the authentication image is rasterized to produce an encoded image having a certain frequency that may correspond, for example, to a certain number of printed lines per inch. When printed, the encoded image may be viewed only through the use of an optical decoding device, preferably a lenticular lens having a line frequency corresponding to that of the encoded image.

Once the digitized encoded image has been constructed, it may be returned as output of the authentication software at S60. The encoded image may be output as an image file and saved for later incorporation into a document. Alternatively, the encoded image may be inserted directly into the document if the software is integrated with the document generation software. The document containing the encoded image may then be further processed, transmitted or printed. It will be understood that the encoded image is graphically embedded within the document so that it is printed simultaneously with the document. When the document is printed, the printed encoded image will be produced in its encoded form so that it cannot be viewed except with the corresponding decoding device. The method ends at S95.

In an illustrative embodiment, the digitized encoded image is added to the word processing version of a document along with a background image or surrounding sold color background that may be in the form of a geometric shape such as a square. The '717 Patent describes how a rasterized encoded image may be embedded into a source image or background. The visible image or background is also rasterized at the selected frequency so that the encoded image may be adjusted according to the color and density of the various parts of the visible image. The encoded image and the visible image are then printed together, with the visible image reproduced in its assembled (i.e., visible) form and the latent image in its encoded (i.e., invisible) form. The latent image becomes visible only when a decoding lens constructed for the selected frequency of the latent image is placed over the latent image.

The digitized encoded image of the present invention may be similarly combined with a background or source image and added to an electronic copy of the document to be authenticated. This may be done by the software used to generate the encoded image or by a separate software program or word processing program subroutine. When the document to be authenticated is printed, the encoded image (and any background or source image embedded with the encoded image) is also printed. While the background and/or source image are visible on the printed copy, the encoded image may be viewed only through the use of a properly oriented decoding device with optical properties configured to correspond to the encoding parameters of the encoded image.

The document and encoded image may be printed on relatively low resolution printers, such as those commonly found in many home and office settings. These may include laser, ink-jet, thermal and indigo printers, for example. A resolution of 200 dots per inch (dpi) has been found to be adequate to produce an encoded image that can be easily verified when viewed on a printed document. Lower resolutions may also provide adequate results.

Once printed, the authentication image from which the encoded image was produced may be revealed through the use of a corresponding decoding device/lens. As shown in FIG. 2, when a lens 30 is placed in the proper orientation over an encoded image 20 that has been printed on a document portion 10, the authentication image 40 is clearly displayed. If the lens 30 is rotated away from this orientation, the authentication image becomes increasingly distorted and unreadable.

In some embodiments of the invention, one or more non-user-supplied encoding parameters may be determined by the authentication software program. In particular, the software program may generate encoding parameters that modify the orientation and/or position of the authentication image as viewed upon decoding of the encoded image. This modification may be random or systematic, but in either case, the orientation is varied to produce an authentication image that is ideally unique to a particular document. Another approach is to automatically add the non-user-supplied indicia or information into the authentication indicia. The non-user-supplied indicia may be placed or oriented so as to be unique for each document.

Figure 3:
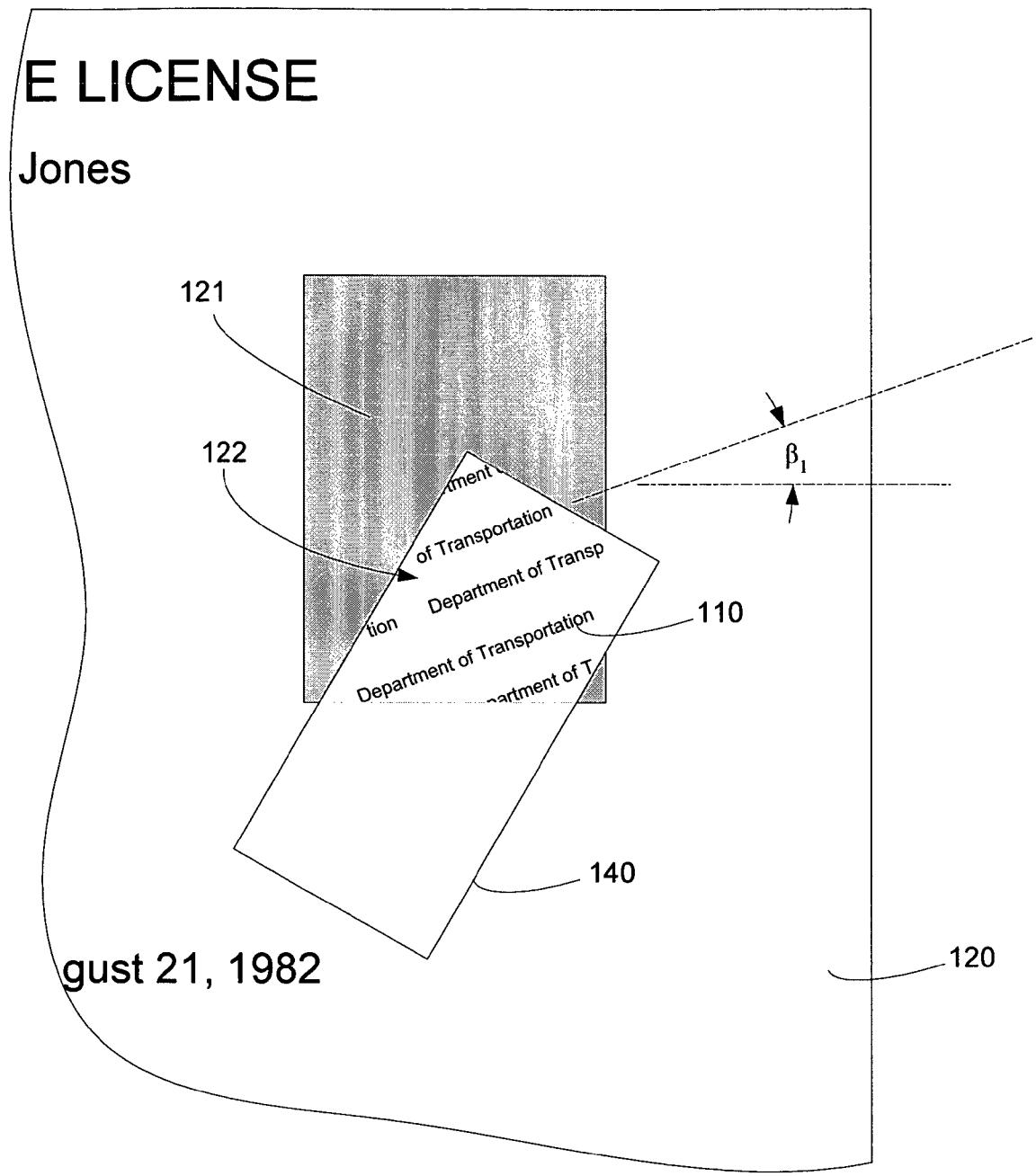
FIG. 3 is an illustration of a portion of an authenticated document showing the use of a decoding device to decode an encoded image produced using a method according to an embodiment of the invention.
Figure 4:
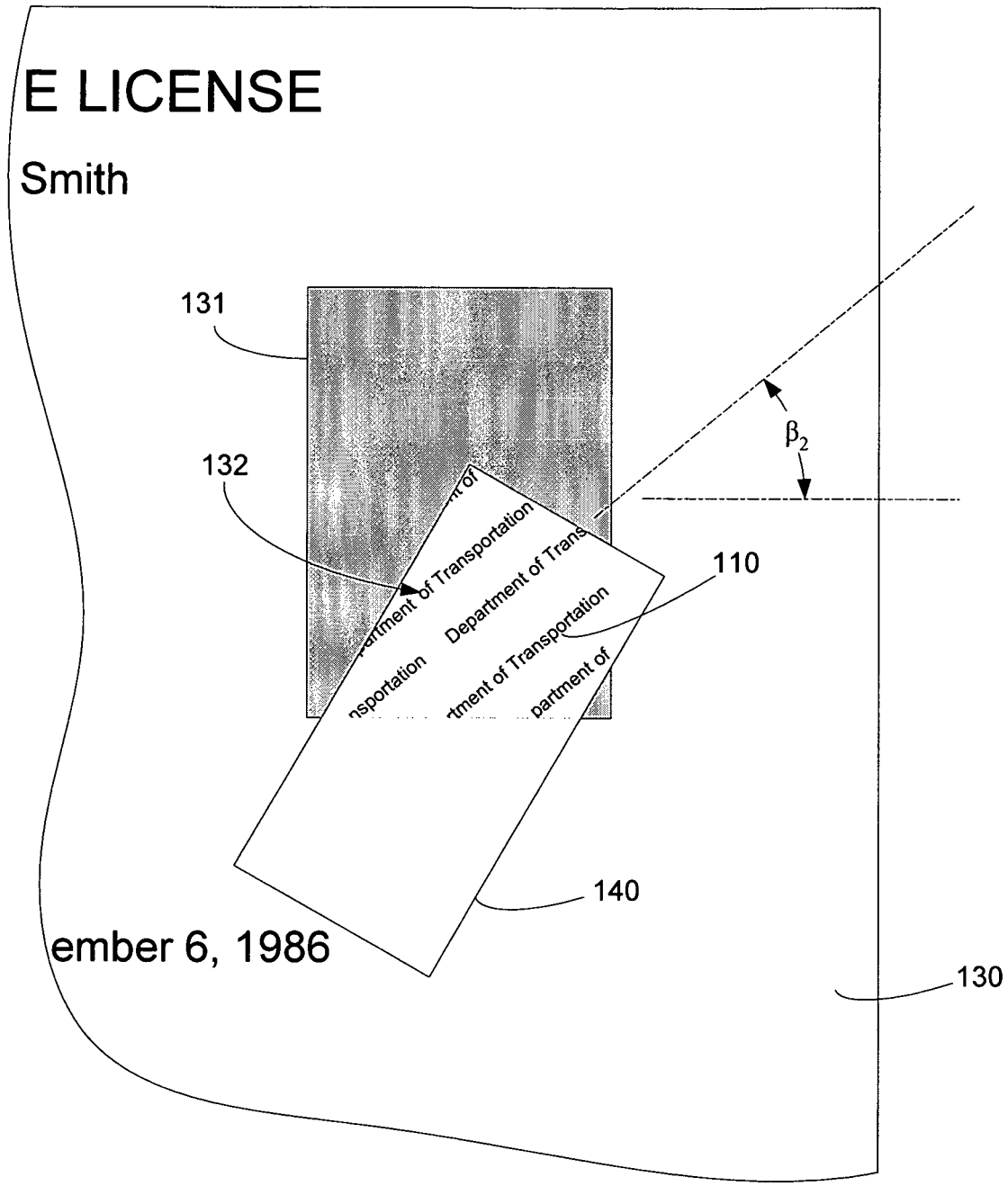
FIG. 4 is an illustration of a portion of an authenticated document showing the use of a decoding device to decode an encoded image produced using a method according to an embodiment of the invention.
Figure 5:
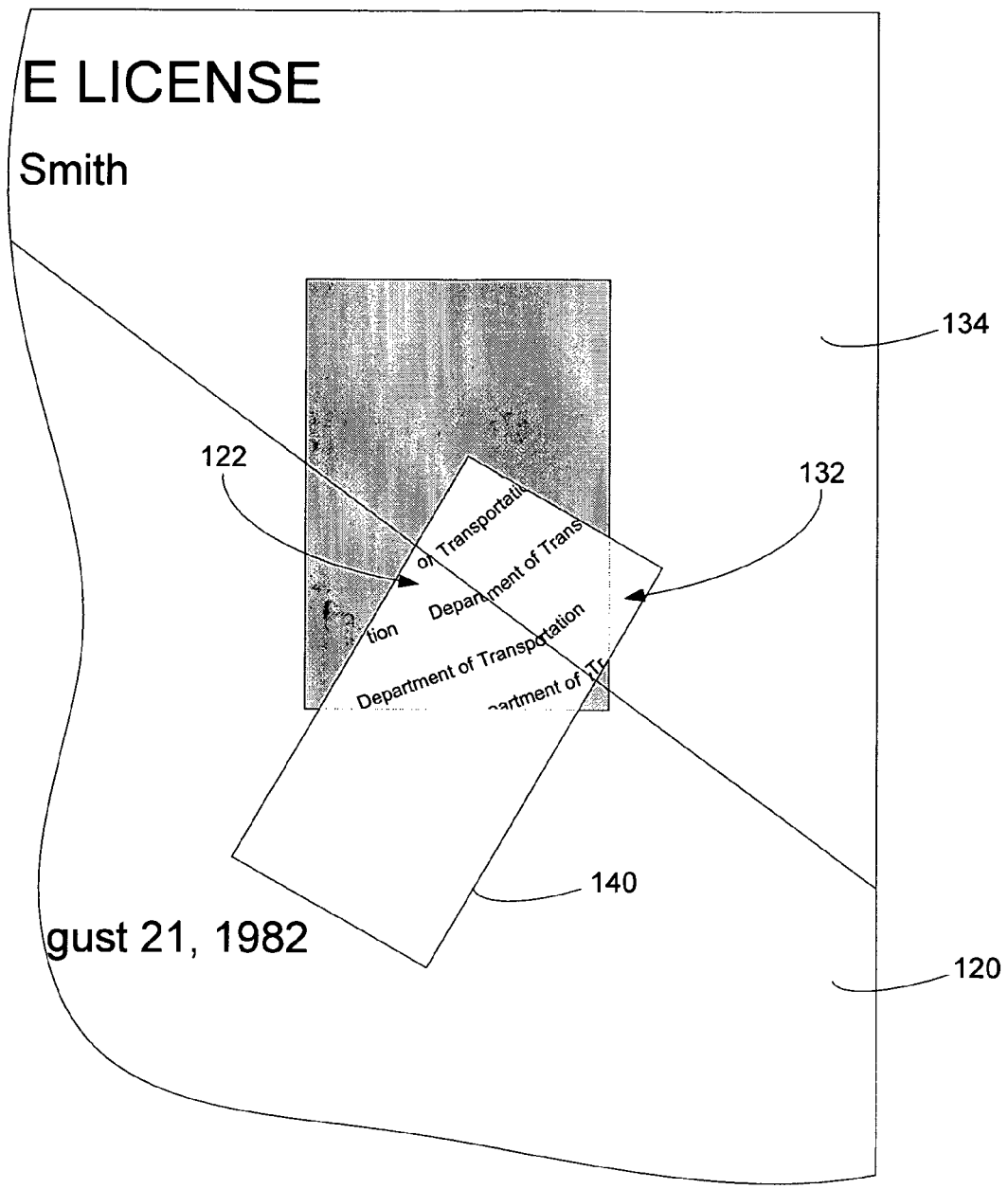
FIG. 5 is an illustration of a portion of an altered authenticated document showing the use of a decoding device to expose the alteration of encoded images produced using a method according to an embodiment of the invention.

When an attempt is made to alter a unique (or semi-unique) authentication image using a "cut and paste" combination with a portion of another authentication image, the two image portions will not match up when decoded. For example, in the two documents 120, 130 with encoded images 121, 131 shown in FIGS. 3 and 4, the authentication indicia 110, ("Department of Transportation") used to produce the wallpaper authentication images 122, 132 is the same for both authentication images. However, through the use of random or systematic modification of the authentication image angle $\beta$ from document to document, the authentication image angle $\beta_1$ for the first authentication image 122 is different from the image angle $\beta_2$ of the second authentication image 132 when viewed using decoding device 140. Thus, if an attempt is made to superimpose or paste a portion 134 of the second image 132 into the first image 122, a clear mismatch results as shown in FIG. 5. This mismatch indicates that the document has been altered.

Figure 6:
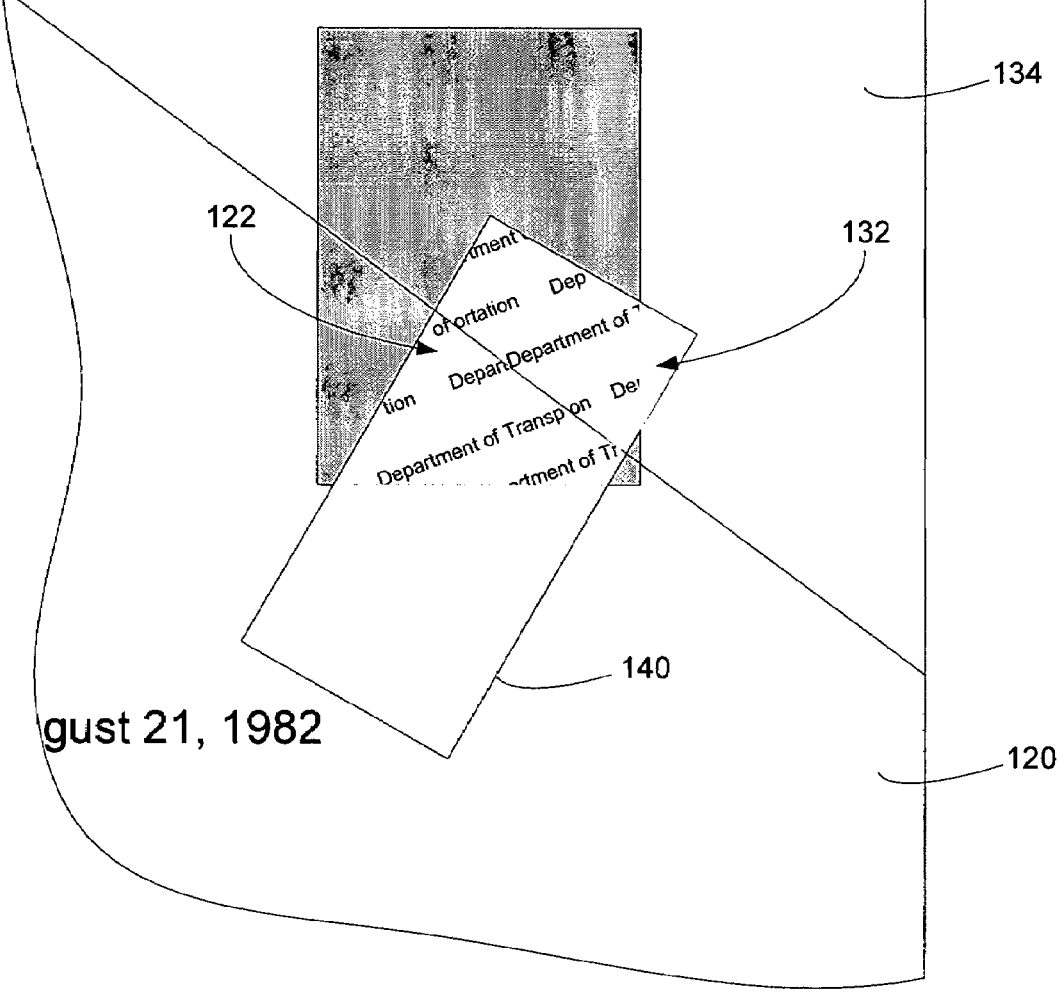
FIG. 6 is an illustration of a portion of an altered authenticated document showing the use of a decoding device to expose the alteration of encoded images produced using a method according to an embodiment of the invention.

In some embodiments, the authentication image angle $\beta$ may remain unchanged from document to document but the spacing of the authentication indicia 110 is systematically or randomly varied so that the wallpaper authentication image is unique for each document. As shown in FIG. 6, when an attempt is made to cut and paste the wallpaper images from portions 1120, 1134 of two such documents, the resulting decoded image will be distorted due to the mismatch of the text in the two images 1122, 1132.

It can thus be seen that the use of document-unique variations in encoding parameters may be used to counteract counterfeiting. Once the document is generated and printed, later attempts to cut and paste portions of the encoded images from multiple documents—each having a different encoding parameter set—to create a new encoded image are readily identifiable because the authentication image portions will be misaligned and/or grammatically garbled. If the document-unique encoding parameters are non-user-supplied parameters, even counterfeiting by the generator or printer of the document is deterred.

As an alternative to or in addition to determining the encoding parameters relating to the authentication image, some methods of the invention may allow the software to determine parameters relating to the orientation or configuration of the authentication image. For example, the software may determine a decoding angle $\alpha$. Thus, the decoding angle $\alpha$ may be made unique so that otherwise similar documents may be uniquely identified. If, as previously described in conjunction with FIG. 5, a counterfeiter attempts to apply a portion of one encoded image over another, the result will be that the decoding device must be oriented at two different angles in order to view the entire authentication image. Thus, even if the authentication images of the two documents are perfectly aligned and positioned, the tampering will still be evident.

It will be understood that the above-described orientation parameters and other encoding parameters, as well as the authentication indicia, may be used alone or in combination to establish a unique document "signature" that prevents the document from being tampered with and which may allow the circumstances of document generation to be determined. It will also be understood that any or all of the encoding parameters and the authentication indicia may be user-provided or non-user-provided.

In some embodiments of the invention, document authentication may be accomplished through the use of a plurality of authentication images combined to form a single encoded image. The authentication images used may have multiple sources. For example, one or more of the authentication images may be based on user-supplied indicia while one or more additional authentication images may be based on non-user-supplied indicia. Any one authentication image may also be a combination of user-supplied indicia and non-user-supplied indicia.

There are several approaches to forming a single encoded image from a plurality of authentication images. One straightforward approach is to digitally combine the plurality of authentication images into a single integrated authentication image. The integrated authentication image may then be encoded through the methodology previously described. As before, the encoding parameter sets for the authentication images may each be a combination of user-provided and non-user-provided encoding parameters. However, while the authentication image encoding parameters could differ for each authentication image, the encoding parameters associated with the decoding of the encoded image (i.e., the decoding angle, decoder frequency, etc.) would be the same for all. The result is an encoded image that, when printed, allows the entire integrated authentication image to be viewed when a corresponding decoding device is positioned at a single orientation over the encoded image.

Another approach is to encode the plurality of authentication images so that the encoding parameters associated with the decoding of the encoded image (the decoding angle, decoder frequency, etc.) may be different for each of the authentication images. Using this approach, a single encoded image may be created that, when printed, allows only one authentication image to be viewed for a given decoding device or for a given decoding angle.

Figure 8:
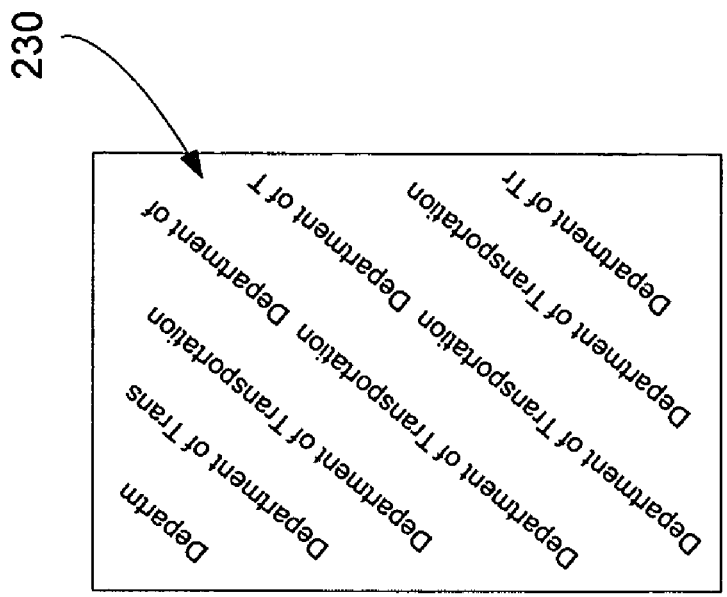
FIG. 8 is an authentication image that may be used in methods of the invention.
Figure 7:
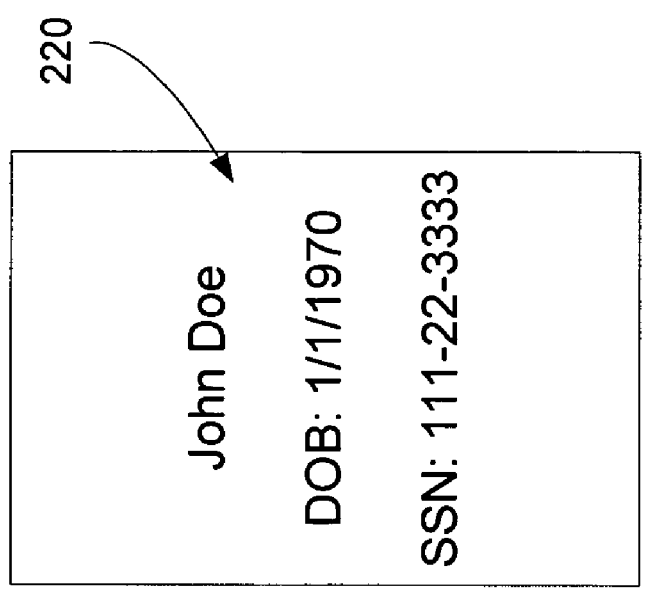
FIG. 7 is an authentication image that may be used in methods of the invention.
Figure 9B:
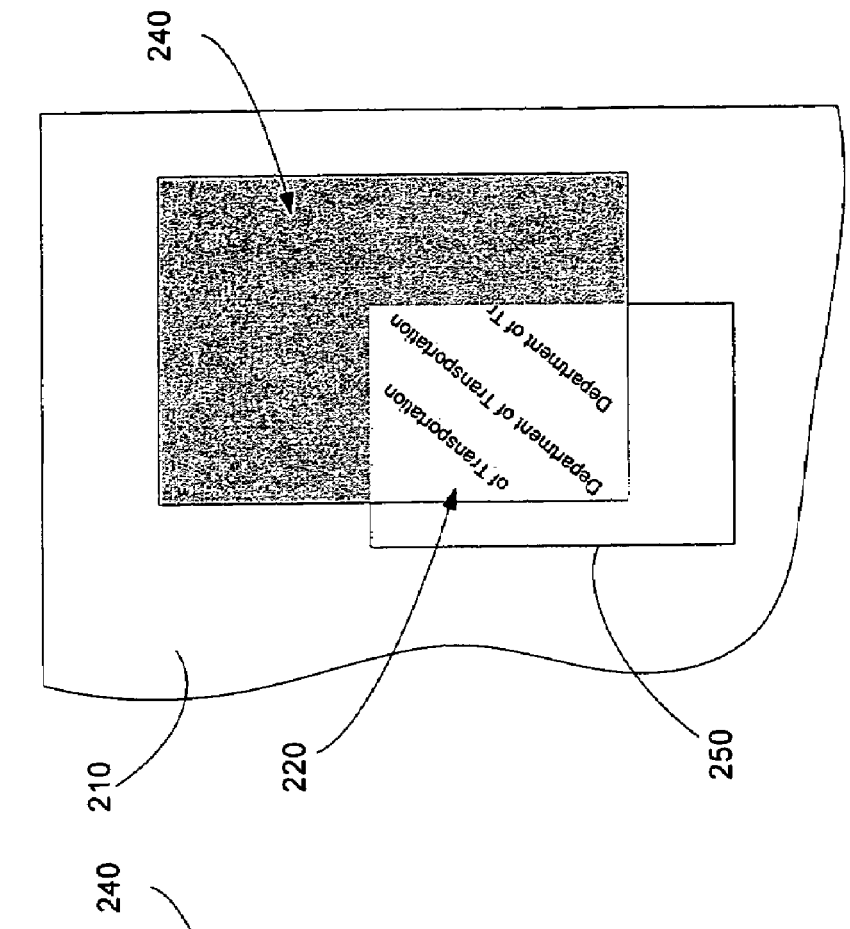
FIG. 9*b* is an illustration of the authenticated document portion of FIG. 8*a* showing the use of a decoding device to decode the encoded image to view a second authentication image.
Figure 9A:
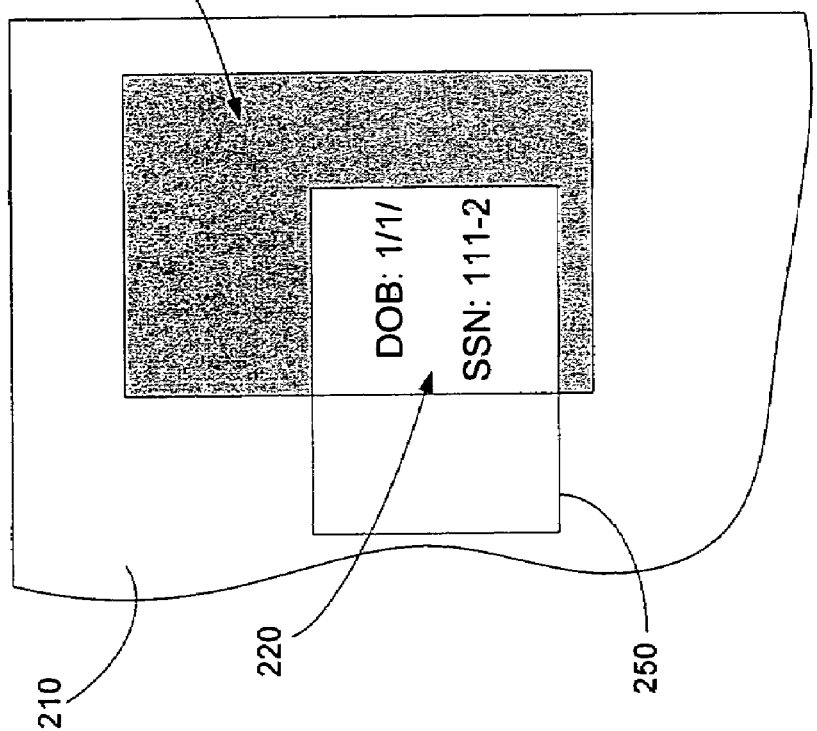
FIG. 9*a* is an illustration of a portion of an authenticated document showing the use of a decoding device to decode an encoded image to view a first authentication image.
Figure 10:
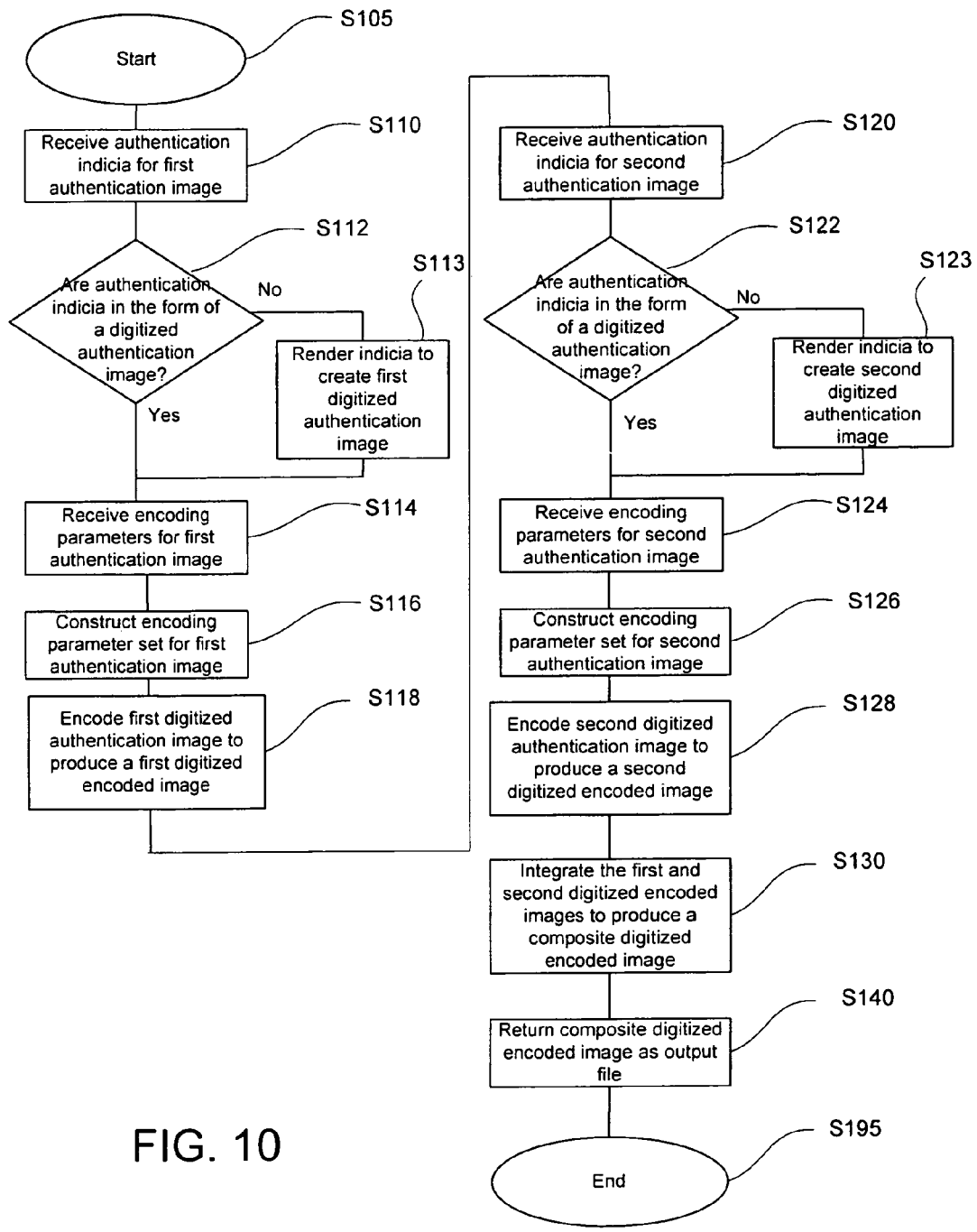
FIG. 10 is a flowchart for a method of producing an encoded image for authenticating a document according to an exemplary embodiment of the invention.

FIGS. 7-9 illustrate an example of this approach for the case when two authentication images are used to generate a single encoded image. FIGS. 7 and 8 illustrate first and second authentication images 220, 230, respectively. Applying the approach of the previous paragraph, the first authentication image 220 is associated with an encoding parameter set in which the decoding angle is 0 degrees and the second authentication image 230 is associated with an encoding parameter set in which the decoding angle is 90 degrees. The encoding parameters associated with the decoding device are the same for the two authentication images. The authentication images 220, 230 were used with the encoding parameters to produce an encoded image 240, which was then applied to a document. FIGS. 9a and 9b illustrate a document portion 210 to which the encoded image has been applied. In FIG. 9a, an appropriate decoding device 250 is oriented at 0 degrees, allowing the first authentication image 220 to be viewed. The second authentication image 230 remains hidden. In FIG. 9*b*, the decoding device 250 has been rotated by 90 degrees, thereby obscuring the first authentication image 220 and allowing the second authentication image 230 to be viewed.

It should be appreciated that, as shown in FIGS. 8*a* and 8*b*, the decoding angle is completely independent of the angle of the authentication indicia and the authentication image angle.

There are at least two ways in which a single encoded image may be generated from a plurality of authentication images having different decoder-associated encoding parameters: (1) encode each authentication separately and integrate them into a single encoded image; and (2) encode the authentication images simultaneously into a single encoded image. A flow chart of a method that uses the first of these approaches to provide a single encoded image from two authentication images is illustrated in FIG. 9. The method begins at S105. At S110, authentication indicia for a first authentication image are received. The authentication indicia may be in the form of an image file or any other data capable of being represented digitally that may be desirable for use in authenticating a document. The authentication indicia for the first authentication image may be either user-supplied or non-user-supplied. The authentication indicia may include information relating to a processor or station at which the document is generated, processed or printed or may include text or other data taken from the document itself.

At S112, a determination may be made as to whether the authentication indicia are in the form of a digitized authentication image. If so, the authentication indicia are accepted as a first digitized authentication image. If the authentication indicia are or include data (e.g., a text string) in a form other than an image format, the data is rendered into an image format at S113, the output being the first authentication image.

Encoding parameters for use with the first authentication image are received at S114 and assembled into a first encoding parameter set at S116. Individual encoding parameters may be user-provided or non-user-provided. User-provided encoding parameters may be supplied by the user interactively or may be supplied and stored for later use by the software. Non-user-provided encoding parameters may be pre-programmed into the software or retrievable from data storage. Non-user-supplied encoding parameters may also be calculated or determined by the software as a function of a processing circumstance or based on a random selection.

At S118, a first digitized encoded image is produced from the digitized authentication image using the first encoded parameter set. As previously discussed, any method for creating an encoded image from the first authentication image may be used.

At S120, authentication indicia for a second authentication image are received. Again, the authentication indicia for the second authentication image may be either user-supplied or non-user-supplied. The authentication indicia may again include information relating to a processor or station at which the document is generated, processed or printed or may include text or other data taken from the document itself.

At S122, a determination may be made as to whether the authentication indicia are in the form of a digitized authentication image. If so, the authentication indicia are accepted as a second digitized authentication image. If the authentication indicia are or include data (e.g., a text string) in a form other than an image format, the data is rendered into an image format at S123, the output being the second authentication image.

Encoding parameters for use with the second authentication image are received at S124 and assembled into a second encoding parameter set at S126. Individual encoding parameters for the second authentication image may be user-provided or non-user-provided and may be provided by and/or received via any of the previously described methods.

At S128, a second digitized encoded image is produced from the digitized authentication image using the second encoded parameter set. Any method for creating an encoded image from the second authentication image may be used, but is preferably the same as the method used for the first authentication image. It will be understood that if additional authentication images are desired, steps S120-S128 may be repeated as necessary.

At S130, the first and second encoded images are integrated to produce a single composite digitized encoded image. The composite digitized encoded image may be stored or returned as output of the authentication software at S140. The encoded image may be output as an image file and saved for later incorporation into a document. Alternatively, the encoded image may be inserted directly into the document if the software is integrated with the document generation software. The document containing the encoded image may then be further processed, transmitted or printed. The encoded image is graphically embedded within the document so that it is printed simultaneously with the document. When the document is printed, the printed encoded image will be produced in its encoded form so that the authentication images cannot be viewed except with the corresponding decoding device or devices. The method ends at S195.

Figure 11:
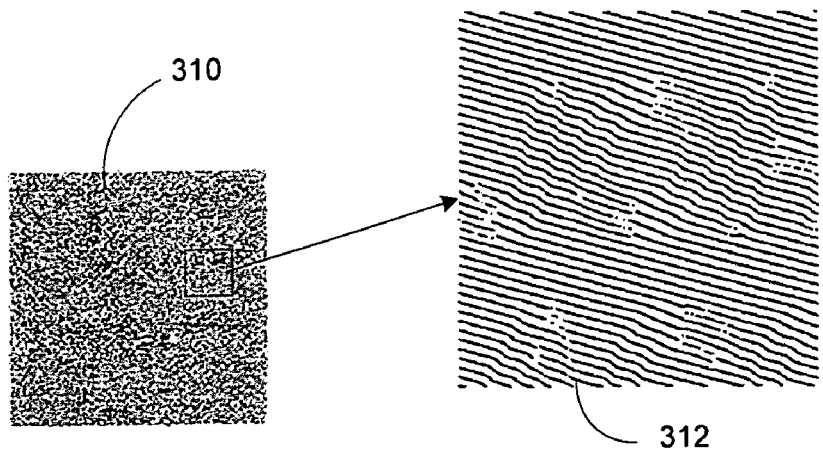
FIG. 11 is an illustration of an encoded image produced using a method according to an embodiment of the invention.
Figure 12:
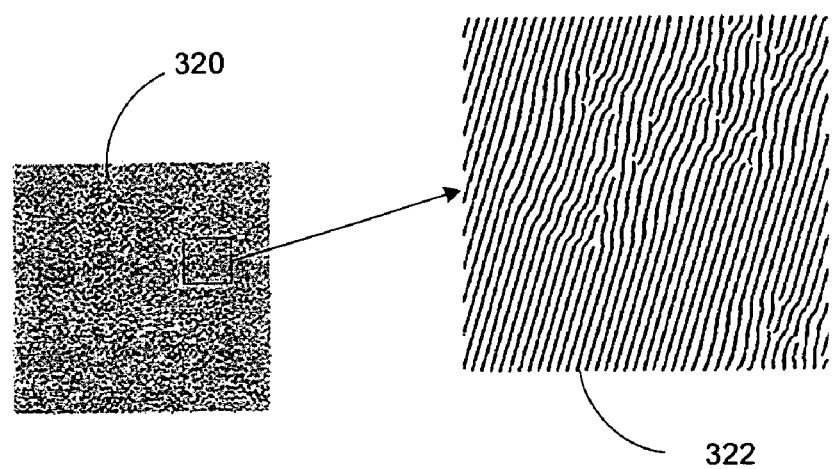
FIG. 12 is an illustration of an encoded image produced using a method according to an embodiment of the invention.
Figure 13:
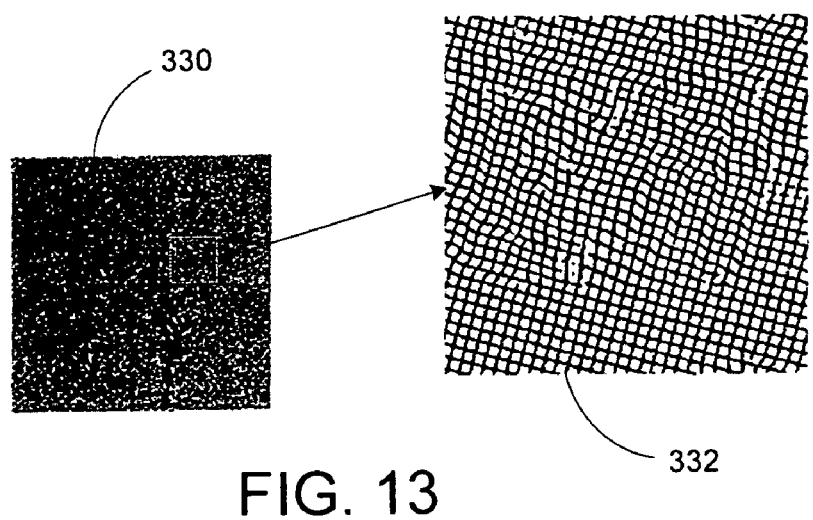
FIG. 13 is an illustration of an encoded image produced from the encoded images of FIGS. 11 and 12 using a method according to an embodiment of the invention.

FIGS. 11-13 illustrate the use of this approach with a rasterization methodology similar to that described in the '717 Patent. FIG. 11 illustrates a first encoded image 310 embedded into a gray background block. The first encoded image 310 is associated with a first authentication image (not shown) and a particular set of encoding parameters including a first encoding angle. A portion 312 of the first encoded image 310 is magnified to show the orientation of the lines of the combined background and encoded image after rasterization. FIG. 12 illustrates a second encoded image 320, which was separately encoded with the same rasterization frequency but a different encoding angle. The second encoded image 320 is associated with a second authentication image (not shown). A portion 322 of the second encoded image 320 is magnified to show the orientation of the lines of the combined background and encoded image after rasterization. FIG. 13 illustrates an integrated encoded image 330 constructed by combining the first and second encoded images 310, 320. A portion 332 of the integrated encoded image is magnified to illustrate the effect of combining the two rasterized images. The integrated encoded image 330 will reveal the first authentication image when a decoding device is oriented at the first decoding angle and will reveal the second authentication image when rotated to the second decoding angle.

Figure 14:
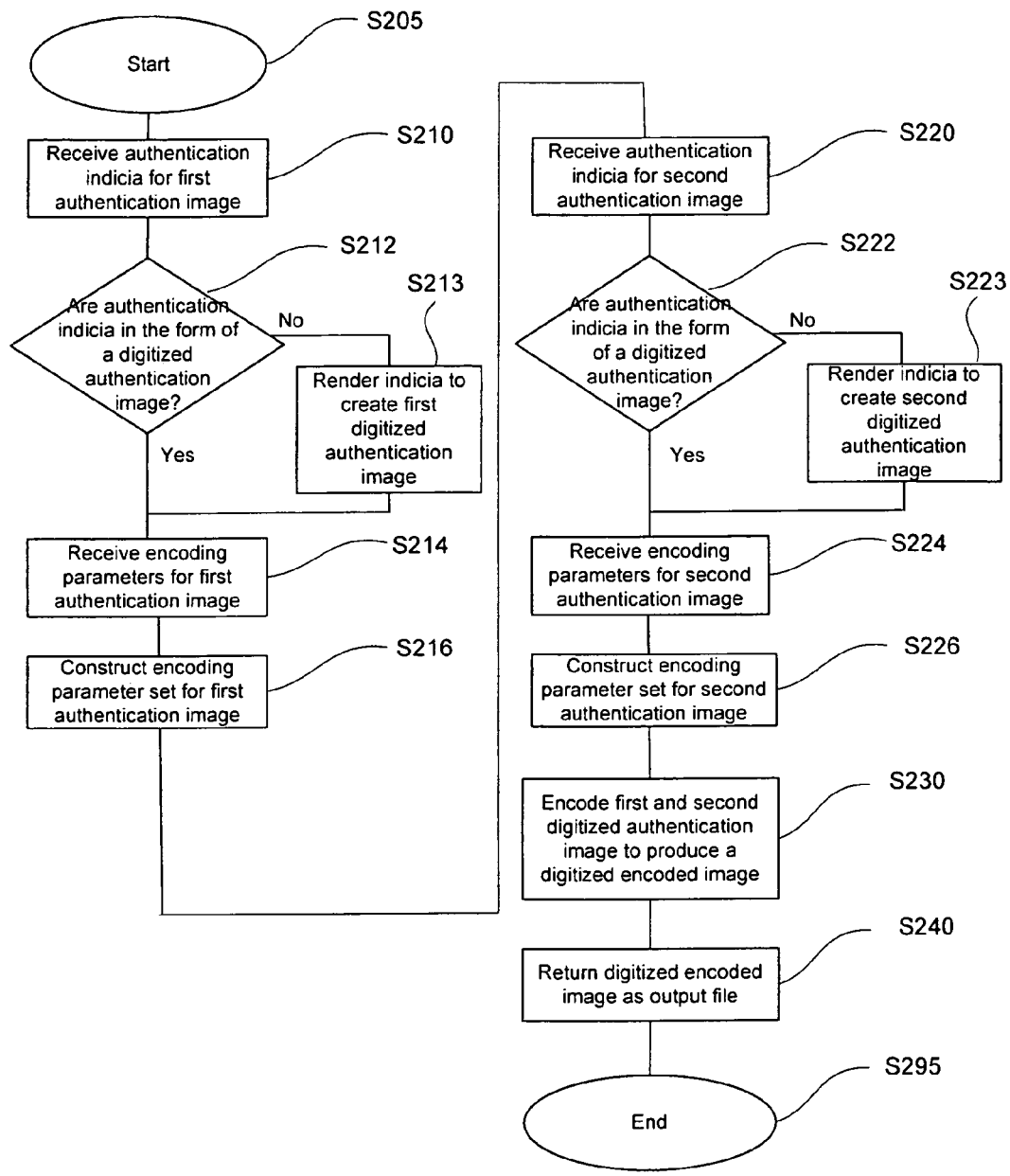
FIG. 14 is a flowchart for a method of producing an encoded image for authenticating a document according to an exemplary embodiment of the invention.

A flow chart of a method that uses the second approach to providing a single encoded image from two authentication images having different decoder-associated encoding parameters is illustrated in FIG. 14. The method begins at S205. At S210, authentication indicia for a first authentication image are received. The authentication indicia may be in the form of an image file or any other data capable of being represented digitally that may be desirable for use in authenticating a document. The authentication indicia for the first authentication image may be either user-supplied or non-user-supplied. The authentication indicia may include information relating to a processor or station at which the document is generated, processed or printed or may include text or other data taken from the document itself.

At S212, a determination may be made as to whether the authentication indicia are in the form of a digitized authentication image. If so, the authentication indicia are accepted as a first digitized authentication image. If the authentication indicia are or include data (e.g., a text string) in a form other than an image format, the data is rendered into an image format at S213, the output being the first authentication image.

Encoding parameters for use with the first authentication image are received at S214 and assembled into a first encoding parameter set at S216. Individual encoding parameters may be user-provided or non-user-provided. User-provided encoding parameters may be supplied by the user interactively or may be supplied and stored for later use by the software. Non-user-provided encoding parameters may be pre-programmed into the software or retrievable from data storage. Non-user-supplied encoding parameters may also be calculated or determined by the software as a function of a processing circumstance or based on a random selection.

At S220, authentication indicia for a second authentication image are received. Again, the authentication indicia for the second authentication image may be either user-supplied or non-user-supplied. The authentication indicia may again include information relating to a processor or station at which the document is generated, processed or printed or may include text or other data taken from the document itself.

At S222, a determination may be made as to whether the authentication indicia are in the form of a digitized authentication image. If so, the authentication indicia are accepted as a second digitized authentication image. If the authentication indicia are or include data (e.g., a text string) in a form other than an image format, the data is rendered into an image format at S223, the output being the second authentication image.

Encoding parameters for use with the second authentication image are received at S224 and assembled into a second encoding parameter set at S226. Individual encoding parameters for the second authentication image may be user-provided or non-user-provided and may be provided by and/or received via any of the previously described methods. It will be understood that if additional authentication images are desired, steps S220-S226 may be repeated as necessary.

At S230, a single digitized encoded image is produced from the first and second digitized authentication images using the first and second encoded parameter sets. Any method for creating encoded images from the first authentication image may be used. The digitized encoded image may be stored or returned as output of the authentication software at S240. The encoded image may be output as an image file and saved for later incorporation into a document. Alternatively, the encoded image may be inserted directly into the document if the software is integrated with the document generation software. The document containing the encoded image may then be further processed, transmitted or printed. The encoded image is graphically embedded within the document so that it is printed simultaneously with the document. When the document is printed, the printed encoded image will be produced in its encoded form so that the authentication images cannot be viewed except with the corresponding decoding device or devices. The method ends at S295.

Figure 15:
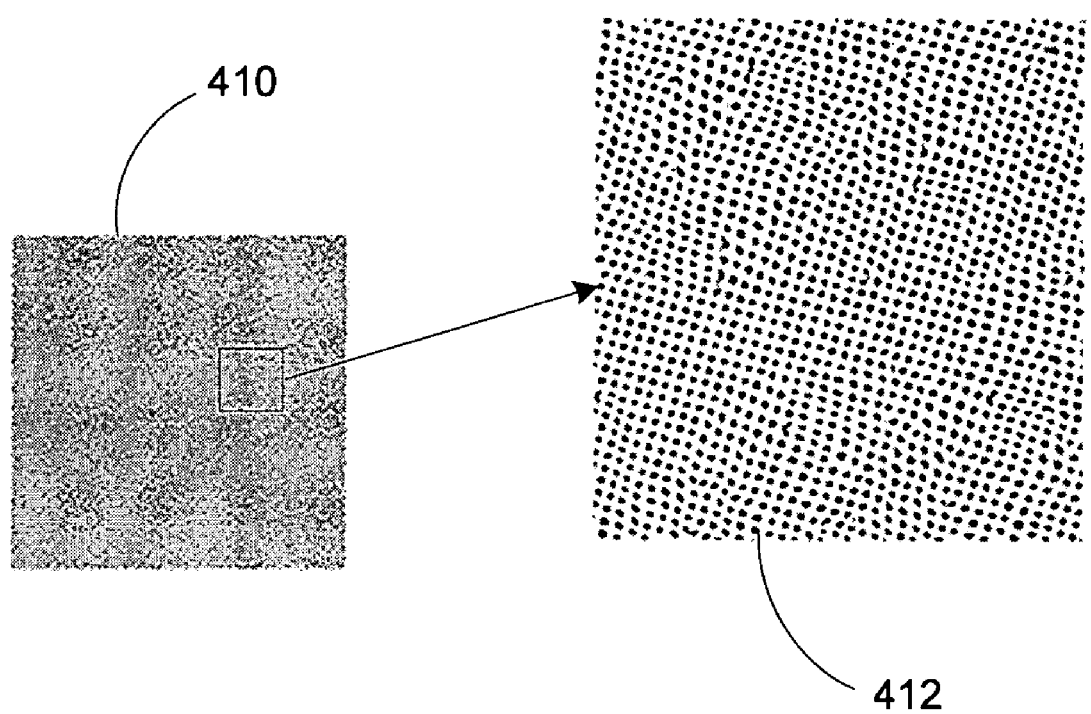
FIG. 15 is an illustration of an encoded image produced from two authentication images using a method according to an embodiment of the invention.

FIG. 15 illustrates an encoded image 410 produced using this approach with a rasterization methodology similar to that described in the '717 Patent. The encoded image 410 embedded into a gray background block. The encoded image 410 is associated with a first and a second authentication image (not shown), each having a particular set of encoding parameters including differing first and second encoding angles. In this method, the first and second authentication angles are rasterized and encoded simultaneously. A portion 412 of the first encoded image 410 is magnified to show the resulting line structure. Similar to the integrated encoded image 330 of FIG. 13, the encoded image 410 will reveal the first authentication image when a decoding device is oriented at the first decoding angle and will reveal the second authentication image when rotated to the second decoding angle.

Some embodiments of the invention provide for the generation of multiple encoded images, each of which may include one or more authentication images. An illustrative embodiment provides for the generation of two encoded images, each having a separate set of characteristics. The authentication images of the two encoded images may be the same or similar or may be entirely different. The encoding parameters of the two images may be different so that the encoded images may have, for example, different image and/or encoding angles or different decoder-associated parameters (e.g., line frequency if a rasterization encoding technique is used). The various encoding parameters for the two encoded images may be any combination of user-supplied and non-user-supplied parameters and may be established so that the encoded images are document unique. In an exemplary case, the parameter sets would be established so that only one of the encoded images is document-unique while the other is only partially unique. The partially unique document may, for example, have characteristics common to all documents generated in a particular facility.

Multiple encoded images produced in the above manner may be stored for later use or immediately embedded in a single document, each encoded image being embedded in substantially the same manner as a single encoded image with multiple authentication images.

As previously discussed, in various applications of the method of the invention, it may be desirable that some or all of the indicia appearing in various authentication images for documents produced by a single user may be common to multiple documents while some are unique or semi-unique to a particular document. Authentication indicia that may change from one document to the next may be referred to as variable indicia. Variable indicia may, for example, be user-supplied for a particular document or set of documents or may be derived from the document itself. Allowing variable indicia to be user-supplied gives the document creator control over at least some of the information that is included in an encoded image. In an exemplary application, the document to be protected could be the title of a vehicle. Variable indicia in this case might include the identity of the lien holder, the mileage of the car, or any other piece of information that may be used in an authentication image to allow later verification of the authenticity of the title. It should be noted that the category or type indicia may or may not be fixed. For example, the indicia category, "name," may be the same for every document, but the actual indicia are variable because the name may change from document to document.

Continuing the example of protecting a vehicle title, indicia identifying the lien holder may always be included as indicia that is sent to the program performing the method of the invention. The indicia is variable because the identity of the lien holder may vary from title to title. In other cases, the user may be given additional control over the type of information to be used as the variable indicia, as well as its identity. For example, the user may first select "mileage" as the variable indicia type, and may then enter the appropriate mileage indicia, which will then be used to construct an authentication image, which will then be decoded.

"Fixed" indicia are those that are unchanged from unchanged from document to document. These may be set by the user but will often be established by a managing authority, software licensor or by the software itself. Returning to the vehicle title example, an example of fixed indicia that may be used on all title documents could be "Department of Transportation." These indicia could be used, for example, to form the wallpaper-type authentication image shown in FIG. 7. It will be understood that although the indicia used to form an authentication image may be fixed, the encoding parameters associated with the indicia may be variable so that the authentication image, the encoded image or both may still be document-unique.

In many of the embodiments of the invention, some or all of the non-user-supplied indicia and/or encoding parameters used to create an encoded image may be read or generated by the software executing the method to produce the encoded image. The resulting encoded image may serve as a signature to identify a particular document printed with that encoded image. In some instances, the software may establish non-user-supplied indicia or encoding parameters based on a document processing circumstance associated with the document to which the encoded image is to be applied. As used herein, a "document processing circumstance" may be any circumstance, description or quality associated with a particular document. This may include the content of the document or any of the circumstances associated with the generation, modification, processing or printing of the document. Document processing circumstances for a particular document may include, for example, the date and time the document was generated or printed, identification of the terminal and/or operator generating or processing the document, or a document number based on a running count of similar documents or based on a number of uses of the software. Information associated with document processing circumstances may be used to form indicia for an authentication image or may be used to determine one or more encoding parameters.

Document processing circumstances may be determined by the software using any method known in the art. For example, the software may obtain time and date information from an internal clock on the data processor where the software is being run. The software may also obtain information about the data processor or network components to which the data processor is connected. The software may also read indicia from a predetermined or random field of the document itself.

Figure 16:
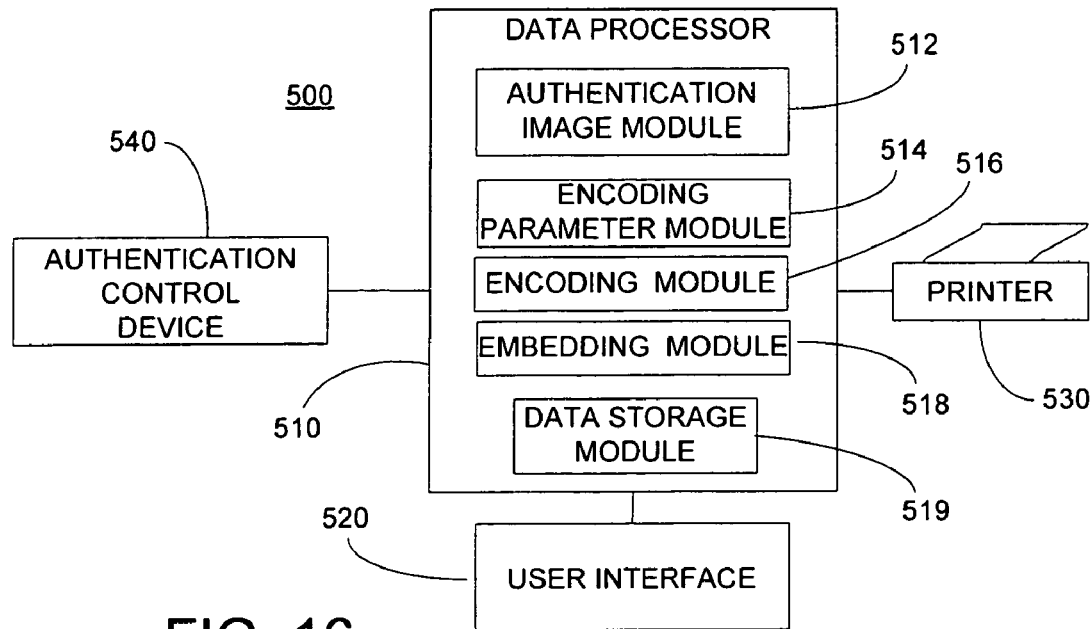
FIG. 16 is a schematic representation of an automated system for incorporating encoded images into a document according to an embodiment of the invention.

Document processing circumstances may also be generated and/or provided by a separate software module, a hardware component connected to the data processor or another processor or server connected to the data processor via a network. With reference to FIG. 16, an automated document authentication system 500 for incorporating encoded images into a document includes a data processor 510 connected to a user interface 520 and a printer 530. The data processor 510 may be configured to process software adapted for carrying out the methods of the invention. In an illustrative embodiment, the data processor 510 may include an authentication image module 512 that receives or generates authentication indicia and, if necessary renders the indicia to form one or more digitized authentication images. The authentication indicia and/or encoding parameters may be received from the user via the user interface 520. The data processor 510 may also include an encoding parameter module 514 that receives and assembles encoding parameters into encoding parameter sets for use in encoding the digitized authentication images.

An encoding module 516 uses the encoding parameters and the digitized authentication images to construct an encoded image, which may be stored in a data storage module 519 or sent to an embedding module 518, which incorporates the encoded image into a document. The resulting document and encoded image may be stored in the data storage module 519 or printed using the printer 530.

The automated document authentication system 500 may also include an authentication control device 540 that may be used to control the use of the authentication process with the data processor 510. The authentication control device 540 may be a separate processor, module or data storage device from which the authentication software may obtain authentication indicia, encoding parameters or data relating to a processing circumstance. As will be discussed hereinafter, the authentication control device 540 may also be used to prevent unauthorized use of the authentication software.

Figure 17:
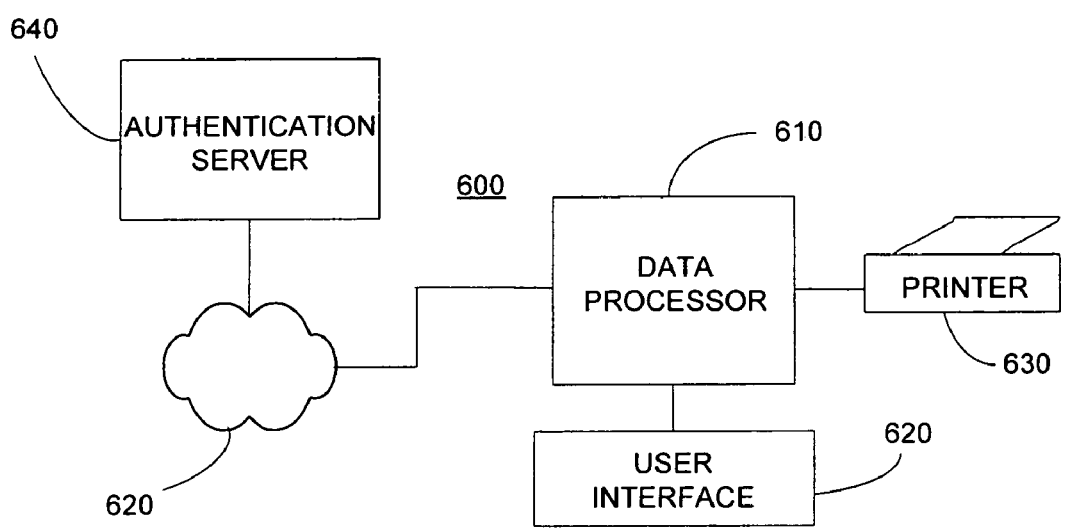
FIG. 17 is a schematic representation of an automated system for incorporating encoded images into a document according to an embodiment of the invention.

With reference to FIG. 17, another aspect of the invention provides an automated document authentication system 600 for incorporating encoded images into a document wherein some or all of the actions relating to generating the encoded image(s) and embedding them into the document are carried out by an authentication server 640 connected to the user's work station or data processor 610 through a network 660. The network 660 may, by way of example, be a local area network that connects a co-located authentication server 640 to a plurality of data processors 610. Alternatively, the authentication server 640 may be remotely located relative to the data processor 610, the two being connected or connectable via the Internet or other wide area network. In either case, the user data processor 610 may be one of a plurality of user data processors and may be connected to a user interface 620 and a printer 630. The document authentication system 600 may also include an authentication control device 650 attached to or in communication with the user data processor 610.

The automated document authentication system 600 may be used to carry out any of the methods described herein. It will be understood that the actions of these methods may be divided up so that some or all of the actions are carried out as part of an interactive transaction conducted between the user data processor 610 and the authentication server 640. It will also be understood that one or more of the actions of the methods of the invention may be carried out by the user data processor 610 while one or more additional actions are carried out by the authentication server 640.

In an exemplary embodiment, an interactive session may be established between the user data processor 610 and the authentication server 640. As part of this transaction, the user may submit to the authentication server 640 one or more authentication images and/or one or more user-supplied encoding parameters. These may then be used by the authentication server 640 to produce an encoded image that is returned to the user data processor 610, where the encoded image is embedded into a document and stored or printed to produce an authenticated printed document. Additional non-user-supplied authentication images and/or encoding parameters may be incorporated into the encoded image by the authentication server 640.

In another exemplary embodiment, the user may submit an entire document to the authentication server 640, which creates and embeds an encoded image into the document and returns it to the user data processor 610 for printing or storage. Along with the document, the user may submit one or more authentication images and/or one or more user-supplied encoding parameters for the authentication server 640 to use in creating the encoded image.

In certain embodiments of the invention, an additional level of security may be implemented to prevent users of the method or the software from using unauthorized images or encoding parameters. In these embodiments, encoding parameters submitted by a user are validated before an encoded image is constructed. These embodiments may include the use of external devices such as the authentication control device 540 to add an independent layer of security removed from the control of the user. In certain embodiments, this may include the use of multiple validation techniques to create a multi-tiered structure to ensure that creating the encoded image is authorized.

Figure 18:
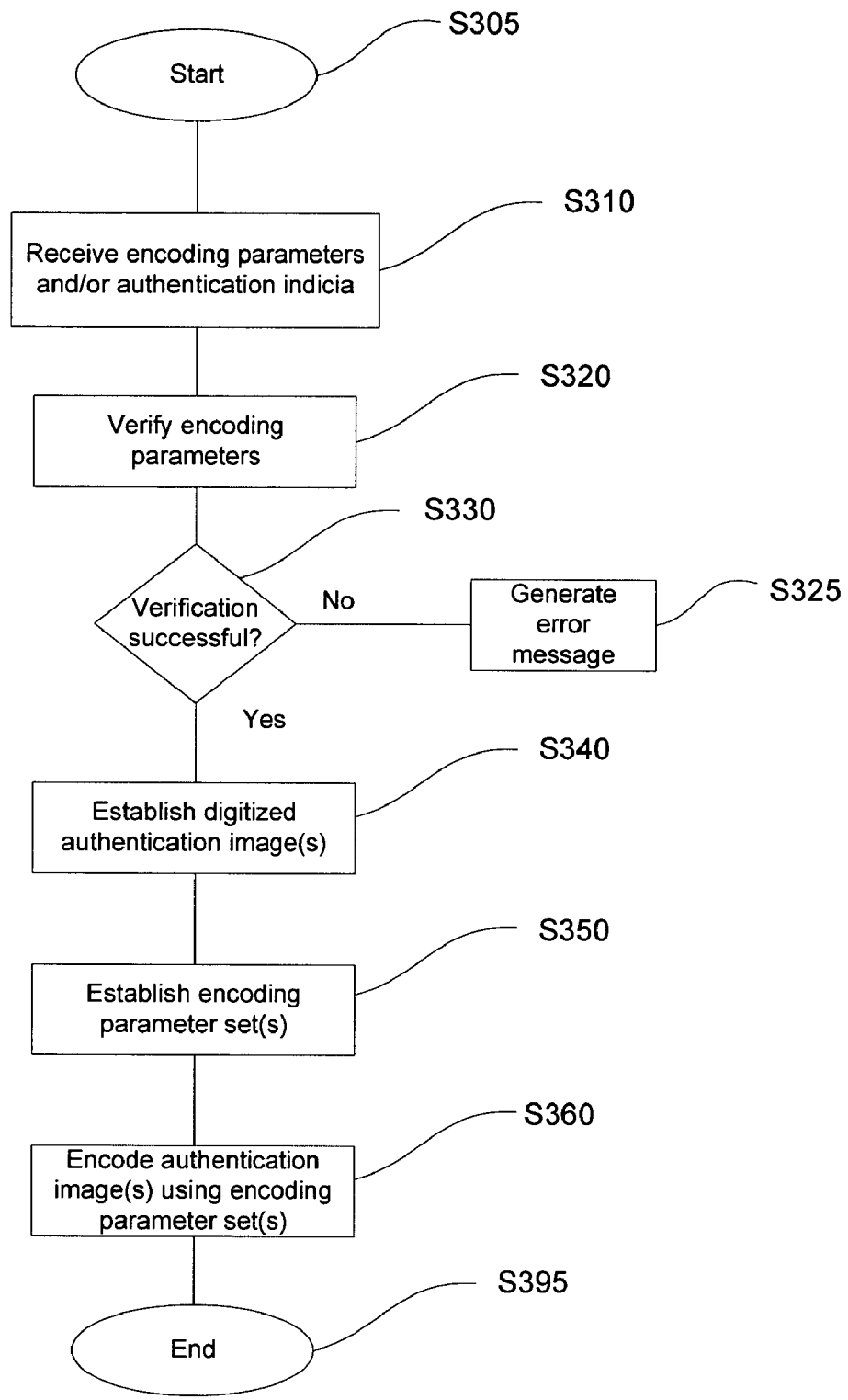
FIG. 18 is a flowchart for a method of producing an encoded image for authenticating a document according to an exemplary embodiment of the invention.

FIG. 18 is a flow chart of a method of producing an encoded image according to an embodiment of the invention wherein the user's authorization to use the method is validated before the encoded image is produced. The method begins at S305 and at S310, encoding parameters and variable indicia are received by the data processor running the authentication software. These may include any combination of user-supplied and non-user-supplied authentication indicia and/or encoding parameters. At S320 and S330, a verification is conducted to determine if the encoding parameters requested by and/or provided by the user fall within previously established authorization criteria. These criteria may, for example, include predetermined limits on the encoding parameters that the user may submit. For example, a user may be permitted to choose only a certain rasterization frequency or orientation of an authentication image.

The verification criteria may be established based on the terms of use agreed to by the user. In addition to limits on encoding parameters or authentication indicia, the verification criteria may include a limit on the number of uses of the authentication software or the number of encoded images that may be produced. In either case, an actual number of uses or images may be incremented each time the software is used. Alternatively, a time-based limit such as an expiration date may be included.

The authentication software may be configured so that an attempt by a user to exceed usage limits or to use encoding parameters or indicia that are outside the terms of use for that user will result in an error message being displayed at S335. The error message could be displayed, for example, if the user requests an encoded image having a rasterization frequency outside the range assigned to the user or if the actual number of uses would exceed the usage limit for the user. Upon determining that the authorization criteria have not been met, the method may be terminated. Alternatively, the user may be prompted to provide input meeting the authorization criteria.

If the authorization criteria are met, the authentication indicia may be used to establish a digitized authentication image (or images) at S340. If necessary, some or all of the authentication indicia may be rendered to form a digitized image as previously discussed. The authentication images may also include non-user-supplied authentication indicia. At S350, the encoding parameters are assembled into an encoding parameter set, which may be used to encode the authentication image(s) at S360. The encoding parameter set may include non-user-supplied encoding parameters in addition to any user-supplied encoding parameters. The resulting encoded image may be stored or embedded into a document as previously discussed. The method ends at S395.

As noted, the methods of the invention may include verifying whether the request by the user to create an encoded image would be in excess of the number of encoded images allotted the user. It will be understood that, depending on the agreed-upon terms of use, the user may be permitted to make an unlimited number of encoded images or may have the right to create only a certain number of encoded images or to create encoded images only for a certain period of time.

Verification of authorization to produce or receive an authentication image may be conducted in a number of ways. For example, an electronic security key or other authentication control device may be used. A security key is typically a piece of hardware that attaches to a parallel or USB portal of a computer. A security key may contain a separate memory, clock and/or power supply that operate independently of the computer to which they are attached. An example of a security key that is usable in embodiments of the invention is the HASP (Hardware Against Software Piracy) device available from Aladdin Knowledge Systems of Arlington Heights, Ill.

Any security key or other authentication control device that may be programmed to validate only certain ranges of encoding parameters and to prevent processing of the method if the received encoding parameters are outside these ranges may be used to carry out the methods of the invention. These devices may be equipped with a clock or counter to monitor the number of encoded images created for use in document protection. In some embodiments, the authorization criteria for a particular user may be stored in the authentication control device for use in verifying authorization. Authentication control devices may also be adapted to generate or assist in generating information that may be used to represent a document processing circumstance.

In other embodiments of the invention, verification may be performed by a separate authentication server, such as the server 640 of the automated document authentication system 600 shown in FIG. 17. As noted above, the server 640 may be adapted to carry out some or all of the actions relating to generating an encoded image and embedding it into a document. The server 640 may also be adapted to verify user authorization before carrying out these actions or before transferring any output or encoding parameters back to the user data processor 610.

In one exemplary embodiment in which a server is used to carry out some or all of the actions relating to producing an authentication image, the server may be centrally controlled by a party independent of the user and may be adapted to monitor and control the security of encoded image creation. When a request for encoding is received by the server, the server may, using known techniques, determine the identity of the user by, for example, the address of the computer sending the request. The received data, which may include user-supplied encoding parameters and/or user-supplied authentication indicia, may then be compared to stored criteria established for the user. The server may also verify that usage limitations have not been exceeded. If the request is within the user's allotment and the encoding parameters are valid, the server may confirm the request. Positive verification may be transmitted back to the user's workstation, thereby permitting the user data processor to continue with the process. Non-user supplied parameters or other server output needed by the user data processor may be included with the verification. Likewise, if the server determines that the user's request falls outside authorization criteria for the user, the server returns a negative verification. This may include an error message to the user explaining the denial of authorization.

The verification procedures described above may also be conducted by a dedicated authorization server that is adapted to authorize or control the use of the encoding process by a user data processor but does not, itself, conduct any of the steps of the encoding process. In embodiments where, once authorized, the entire process of producing and embedding an authentication image is carried out on the user's data processor, the authorization server may be used in place of the authentication server 640 to verify authorization. In embodiments where some or all of the encoding and embedding process is carried out using an authentication server 640, a separate authorization server may be used to determine if the process steps should be carried out by the authentication server 640 or whether non-user-supplied encoding parameters should be transmitted to the user data processor.

It should be appreciated that these methods of verification are by way of example only and that any method of verifying the encoding parameters may be used in accordance with various embodiments of the invention. Embodiments in which the verification is external to the workstation may be advantageous in applications where the user purchases the right to encode a specific number of images or to encode a certain number of images over a period of time. A clock or counter contained on an external device independent of the workstation may prevent the user from tampering with the workstation, such as by resetting the date on the workstation to provide additional time to use the encoding software without paying.

Multiple verification/authorization techniques may be used in combination with one another to provide multiple tiers of protection and to permit more efficient use of the system. For example, an authentication software customer may be located in an office or agency with many users, each creating documents at a separate workstation. In certain methods of the invention, a first level of authorization verification may be applied at the user workstation level, while a second level of authorization verification may be applied at the customer level. Such multiple verification techniques may be advantageous to monitor overall encoded image creation for the customer as well as encoded image creations at individual workstations or groups of workstations, which may use different encoding parameters or need to produce a different number or type of encoded image.

By way of example, a government agency may wish to purchase the right to create a specific number of encoded images by using the described methods. However, certain people within the agency may need to produce disparate numbers of protected documents. Multiple verification may provide for a central processor (which may be an authentication server, an authorization server or both) to count the total number of encoded images created for the agency, while software on each workstation counts the number of encoded images created at that workstation. The central processor may be at any location in close proximity to or remote from the local workstations. At any given time, authorization may be required from both the local data processor (workstation) and from the central processor before an encoded image may be created.

A combination of local and remote verification techniques can be used to prevent unauthorized access. For example, even if a counterfeiter were able to steal both the software for creating the encoded images and a security key for a user work station, he could still be prevented from producing an encoded image by withholding authorization from the remote central processor.

In some methods of the invention, a first level of verification and authorization may be conducted by a first server and a second level of verification and authorization may be conducted by a second server. The first server may, for example, be a local server for a particular customer having a plurality of encoding process users each with their own data processor. The first server may conduct a first level of authorization based on a first level of authorization criteria, then request a second level of verification and authorization from a remote second server such as may be operated by the licensor of the encoding process.

Figure 19:
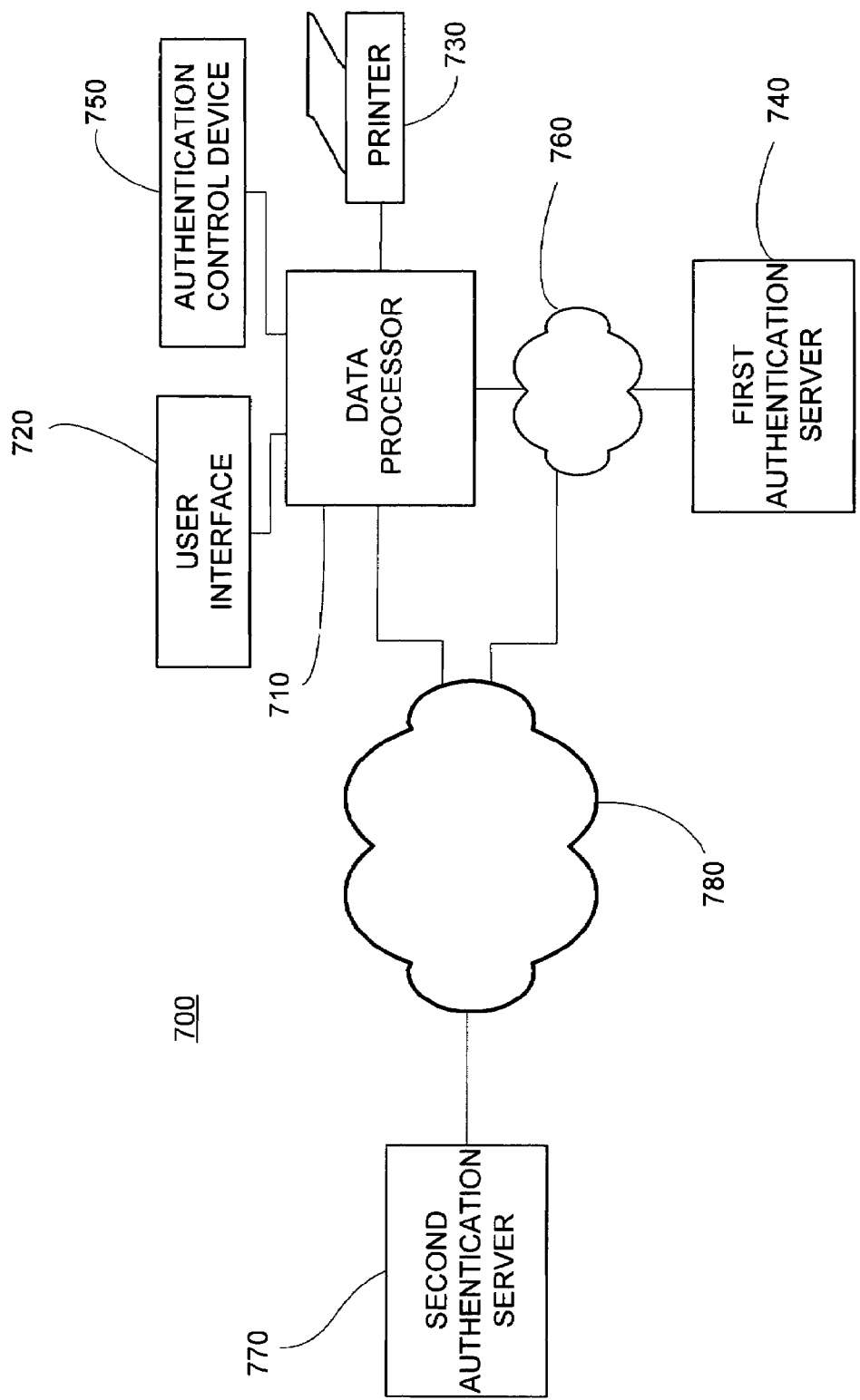
FIG. 19 is a schematic representation of an automated system for incorporating encoded images into a document according to an embodiment of the invention.

FIG. 19 illustrates an automated document authentication system 700 that incorporates multiple authorization levels. The document authentication system 700 includes a first authentication server 740 connected to a user data processor 710 through a first network 760. The first network 760 may, for example, be a local area network and the first authentication server 740 may be co-located with the data processor 710. Alternatively, the authentication server 740 may be remotely located relative to the data processor 710. In either case, the user data processor 710 may be one of a plurality of user data processors and may be connected to a user interface 720 and a printer 730. An authentication control device 750 may also be attached to or in communication with the user data processor 710.

The user data processor 710 may be adapted to carry out one or more of the actions associated with encoding an image for use in authenticating a digital document according to the methods described herein and for printing the authenticated document using the printer 730. However, the user data processor 710 may carry out these actions only upon receiving authorization approval from one or more of the authentication control device 750, the first authentication server 740 and a second authentication server 770.

The first authentication server 740 may be programmed to monitor and control the processing of encoding actions on the user data processor 710. For example, the first authentication server 740 may be configured to receive from the user data processor 710 a request to encode an image using certain user-supplied encoding parameters and/or authentication indicia. The first authentication server 740 may be further programmed to verify that the user and the user data processor 710 are authorized to carry out the encoding process using these encoding parameters and indicia. This verification is conducted using a first set of authentication criteria that may be established, at least in part, by the management entity controlling the first authentication server 740. Upon concluding that the request meets the first authorization criteria, the first authentication server 740 may return an authorization approval to the user data processor 710. The user data processor 710 may then send the request or a modified form of the request to the second authentication server via the second network 780. Alternatively, the first data processor 740 may send the request or a modified form of the request directly to the second authentication server 770.

The second authentication server 770 is in communication with or selectively in communication with either or both of the user data processor 710 and the first authentication server 740 via the second network 780. The second network 780 may be the same network as the first network 760 or may be a different network. In an illustrative embodiment, the first network 760 is a local network while the second network 780 is the Internet. In another embodiment, the user data processor 710, the first authentication server 740 and the second authentication server 770 are all interconnected via the Internet.

The second authentication server 770 may be programmed to receive and evaluate encoding authorization requests from any of a plurality of user data processors 710 and first authentication servers 740. The second authentication server 770 may have a variety of user-associated or customer-associated authorization criteria that may be compared to the data received in an authorization request from a user data processor 710 or first authentication server. The second authentication server 770 may be adapted to verify that the user and the user data processor 710 are authorized to carry out the encoding process using the encoding parameters and indicia submitted in the authorization request. This verification may be conducted using a second set of authentication criteria that may be based on the terms of any usage agreement established with the using entity or organization. These criteria may include limits on the encoding parameters that may be used, limits on the number of times the encoding software may be used, limits on the number of encoded images that may be produced and limits on the content of user-supplied authentication indicia. Upon concluding that the request meets the second authorization criteria, the second authentication server 770 may return an authorization approval to the user data processor 710 and/or the first authentication server. At the same time, the second authentication server 770 may provide certain non-user-supplied encoding parameters and/or authentication indicia to be used by the user data processor in constructing the requested encoded image.

It will be understood that the various encoding actions of the previously described authentication methods may be divided up so that some or all of the actions are distributed between the user data processor 710 and the first and second authentication servers 740, 770. It will also be understood that one or more of the actions of the methods of the invention may be carried out by the user data processor 710 while one or more additional actions are carried out by the authentication servers 740, 770 as part of or in conjunction with the verification/authentication process. In a particular embodiment, the first authentication server 740 may be used to store a detailed log of encoding activity to prevent internal fraud. If a stronger separation of encoding and logging activities is desired, the log can instead be maintained at the second authentication server 770.

It should be appreciated that in embodiments where an authentication server is used to verify the encoding parameters over a network, the server could additionally provide non-user-supplied indicia, including a unique identifier. Alternatively, as previously described, the entire encoded image creation could be performed by software on the authentication server or another location external to the user's workstation without any action on the part of the user other than to provide any required user-supplied indicia and/or encoding parameters. For example, the authentication server may receive user-supplied encoding parameters and indicia for verification. Upon verifying that the user-supplied encoding parameters and indicia are within the predetermined criteria for the user, the server could (if necessary) render the authentication indicia, assemble the encoding parameters and use them to create an encoded image. The encoded image could be saved as a file and transmitted back to the user at the work station.

In some embodiments of the invention, the authentication indicia may include unique information such as information relating to a document processing circumstance as described above. Such indicia, along with other characteristics or information relating to the document may be transmitted to or generated by the server. This information may be stored in a database along with other information relevant to the document and may be used later to verify the authenticity of a document. For example, as previously described, a document may have indicia corresponding to the time and date of creation contained in the authentication image. In some circumstances, these indicia may be compared to information derived directly from the encoded image. Alternatively, the encoded image may be used to as a signature for the document that links the document to the information stored in the central database. When the authentication image is revealed, the an investigator can use it to determine recall the information from the database, which can then be compared to the indicia on the face of the document. In yet another alternative, information obtained directly from the encoded image could be used in combination with information stored in the database to determine whether the document being verified corresponds to the one for which the encoded image was created.

General aspects of possible implementation of the inventive technology will now be described. Various method and operating system embodiments of the inventive technology are described above. It will be appreciated that the systems of the invention or portions of the systems of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As previously discussed, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It will be understood that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, It will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, It will be understood that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, HTTP, UDP, OSI, SOAP, or any other messaging protocol.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

It will be understood that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, any .NET language, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. An automated method of producing encoded images for incorporation into a digital document, the method comprising:

receiving a request from a user to produce an encoded image, the request including user-supplied data for producing the encoded image, the user-supplied data including at least one of user-supplied authentication indicia and at least one user-supplied encoding parameter;

determining whether the user is authorized to produce an encoded image using the user-supplied data;

responsive to a determination that the user is authorized to produce an encoded image using the user-supplied data, carrying out encoding actions including establishing at least one digitized authentication image, establishing an encoding parameter set including any user-supplied encoding parameters, the encoding parameter set being usable to encode one or more of the at least one digitized authentication image, and encoding one or more of the at least one digitized authentication image using the encoding parameter set to produce a final encoded image.

2. An automated method according to claim 1 wherein the digital document is included with the request.

3. An automated method according to claim 1 wherein the encoding actions further include:

embedding the final encoded image into a digital document.

4. An automated method according to claim 3 wherein the encoding actions further include:

printing the digital document with the final encoded image embedded therein.

5. An automated method according to claim 1 wherein at least one of the encoding actions is carried out on a user data processor and the actions of receiving a request from a user and determining whether the user is authorized to produce an encoded image using the user-supplied data are carried out by an authentication control device connected to the user data processor.

6. An automated method according to claim 1 wherein at least one of the encoding actions is carried out on a user data processor and the actions of receiving a request from a user and determining whether the user is authorized to produce an encoded image using the user-supplied data are carried out by a separate data processor in communication with the user data processor over a network.

7. An automated method according to claim 6 wherein the separate data processor is an authentication server adapted for carrying out at least one of the encoding actions.

8. An automated method according to claim 1 wherein the action of determining whether the user is authorized to produce an encoded image using the user-supplied data includes determining whether the user-supplied data meets predetermined authorization criteria for the user.

9. An automated method according to claim 8 wherein the predetermined authorization criteria includes a limiting range on a predetermined user-supplied encoding parameter.

10. An automated method according to claim 1 wherein the action of determining whether the user is authorized to produce an encoded image using the user-supplied data includes determining a number of uses of the encoding actions for the user; and comparing the number of uses to a predetermined usage limit for the user.

11. An automated method according to claim 1 wherein the action of determining whether the user is authorized to produce an encoded image using the user-supplied data includes determining at least one of a time and date of processing associated with the request; and comparing the at least one of the time and date of processing to a predetermined expiration limit for the user.

12. An automated method according to claim 1 wherein the at least one user-supplied encoding parameter includes one or more encoding parameters from a set consisting of a decoding angle relative to a first reference frame associated with the digital document, an authentication image angle relative to a second reference frame associated with the digital document, an authentication image repetition frequency, a rasterization type and a rasterization frequency.

13. An automated method according to claim 1 wherein the request includes user-supplied authentication indicia and wherein the action of establishing at least one digitized authentication image includes incorporating the user-supplied authentication indicia into the at least one digitized authentication image.

14. An automated method according to claim 1 wherein the encoding parameter set includes at least one user-supplied encoding parameter and at least one non-user-supplied encoding parameter.

15. An automated method according to claim 14 wherein the request includes the digital document and the action of establishing an encoding parameter set includes:

identifying a document processing circumstance; and establishing at least one of the at least one non-user-supplied parameter using the document processing circumstance.

16. An automated method according to claim 15 wherein the document generation circumstance is one of a document processing time, a document processing date, a processing machine identifier and an operator identifier.

17. An automated method according to claim 15 wherein the document processing circumstance includes data associated with the processing of the digital document.

18. An automated method according to claim 17 wherein the data associated with the processing of the digital document includes content taken from the digital document.

19. An automated method according to claim 1 wherein the request includes the digital document and the action of establishing at least one digitized authentication image includes:

identifying a document processing circumstance;

determining a set of non-user supplied authentication indicia using the document processing circumstance; and constructing the at least one digitized authentication image using the non-user-supplied authentication indicia.

20. An automated method according to claim 19 wherein the document generation circumstance is one of a document processing time, a document processing date, a processing machine identifier and an operator identifier.

21. An automated method according to claim 19 wherein the document processing circumstance includes data associated with the processing of the digital document.

22. An automated method according to claim 21 wherein the data associated with the processing of the digital document includes content taken from the digital document.

23. An automated method according to claim 1 wherein the action of determining whether the user is authorized to produce an encoded image using the user-supplied data includes:
   determining whether the user is authorized at a first level of user authorization; and
   determining whether the user is authorized at a second level of authorization.

24. An automated method according to claim 23 wherein the action of determining whether the user is authorized at a first level of user authorization includes
   determining whether the user-supplied data meets predetermined first level authorization criteria for the user.

25. An automated method according to claim 24 wherein the predetermined first level authorization criteria includes a limiting range on a predetermined user-supplied encoding parameter and the action of determining whether the user-supplied data meets predetermined first level authorization criteria for the user includes:
   comparing the predetermined user-supplied encoding parameter received from the user with the limiting range on the predetermined user-supplied encoding parameter.

26. An automated method according to claim 23 wherein the action of determining whether the user is authorized at a second level of authorization includes
   determining a number of uses of the encoding actions for the user; and
   comparing the number of uses to a predetermined usage limit for the user.

27. An automated method according to claim 23 wherein the action of determining whether the user is authorized at a second level of authorization includes
   determining at least one of a time and date of processing associated with the request; and
   comparing the at least one of the time and date of processing to a predetermined expiration limit for the user.

28. An automated method according to claim 23 wherein the action of determining whether the user is authorized at a first level of authorization is carried out by an authentication control device connected to the user data processor.

29. An automated method according to claim 23 wherein the action of determining whether the user is authorized at a second level of authorization is carried out by an authentication server in communication with the user data processor over a network.

30. An automated method according to claim 23 wherein the action of determining whether the user is authorized at a first level of authorization is carried out by a first authentication server in communication with the user data processor over a first network and the action of determining whether the user is authorized at a second level of authorization is carried out by a second authentication server in communication with at least one of the user data processor and the first authentication server over a second network.

31. A method of controlling encoded image production in an automated system for authenticating a printed version of a digital document, the system including a user data processor in communication with a server, the user data processor being adapted for carrying out image encoding actions using user-supplied data including user-supplied authentication indicia and user-supplied encoding parameters, the method comprising:
   receiving from a user at the server an authorization request to produce an encoded image, the request including at least one of a user-supplied encoding parameter and user-supplied authentication indicia;
   determining whether the user is authorized to produce an encoded image using the at least one of a user-supplied encoding parameter and user-supplied authentication indicia;
   responsive to a determination that the user is authorized to produce an encoded image using the user-supplied data, transmitting an authorization approval to the user data processor.

32. An automated method according to claim 31 wherein the server is an authentication server adapted to carry out at least one encoding action required to produce the encoded image for which authorization is requested by the user.

33. An automated method according to claim 31 wherein the action of determining whether the user is authorized to produce an encoded image includes
   determining whether production by the user of an encoded image using the user-supplied data meets predetermined usage criteria for the user.

34. An automated method according to claim 33 wherein the predetermined usage criteria includes at least one of a limit on number of uses of the encoding actions, a limit on number of encoded images produced using the encoding actions and a temporal limit on usage of the encoding actions.

35. An automated method according to claim 31 wherein the action of determining whether the user is authorized to produce an encoded image includes
   determining whether the at least one of a user-supplied encoding parameter and user-supplied authentication indicia meets predetermined authorization criteria for the user.

36. An automated method according to claim 35 wherein the predetermined authorization criteria includes a limiting range on at least one predetermined user-supplied encoding parameter.

37. An automated method according to claim 35 wherein the predetermined authorization criteria includes a restriction on the user-supplied authentication indicia.

38. An automated method according to claim 31 wherein the at least one of a user-supplied encoding parameter and user-supplied authentication indicia includes an encoding parameter from a set consisting of a decoding angle relative to a first reference frame associated with the digital document, an authentication image angle relative to a second reference frame associated with the digital document, an authentication image repetition frequency, rasterization type and a rasterization frequency.

39. An automated system for producing encoded images for incorporation into a digital document, the system comprising:
   a user interface adapted for receiving user-supplied data comprising at least one of user-supplied authentication indicia and a user-supplied encoding parameter;
   a user data processor in communication with the user interface, the user data processor adapted for carrying out at least one of a set of image encoding actions, the set of image encoding actions including
      establishing a digitized authentication image,
      establishing an encoding parameter set including user-supplied encoding parameters, the encoding parameter set being usable to encode the digitized authentication image, and encoding the digitized authentication image using the encoding parameter set to produce a final encoded image; and an authentication control device in communication with the data processor, the authentication control device being adapted to determine whether a user is authorized to produce an encoded image using the user-supplied data and for preventing the data processor from carrying out image encoding actions responsive to a determination that the user is not authorized to produce an encoded image using the user-supplied data.

40. An automated system according to claim 39 further comprising:

an authorization server in communication with the data processor over a network, the authorization server being adapted to receive an image encoding authorization request from the user data processor, determine whether the user is authorized to produce an encoded image using the user-supplied data and transmit an authorization approval to the user data processor responsive to a determination that the user is authorized to produce an encoded image using the user-supplied data.

41. An automated system according to claim 39 further comprising:

an authentication server in communication with the data processor over a network, the authentication server being adapted to carry out at least one of the set of image encoding actions.

42. An automated system according to claim 41 wherein the authentication server is further adapted to receive an authorization request from the user data processor, determine whether the user is authorized to produce an encoded image using the user-supplied data and for transmitting an authorization approval to the user data processor responsive to a determination that the user is authorized to produce an encoded image using the user-supplied data.

43. An automated system for producing encoded images for incorporation into a digital document, the system comprising:

a user data processor having means for receiving user-supplied data comprising at least one of user-supplied authentication indicia and a user-supplied encoding parameter and means for carrying out at least one of a set of image encoding actions, the set of image encoding actions including establishing a digitized authentication image, establishing an encoding parameter set including user-supplied encoding parameters, the encoding parameter set being usable to encode the digitized authentication image, and encoding the digitized authentication image using the encoding parameter set to produce a final encoded image; and an authentication control device in communication with the data processor, the authentication control device having first means for determining whether a user is authorized to produce an encoded image using the user-supplied data and means for preventing the data processor from carrying out image encoding actions responsive to a determination that the user is not authorized to produce an encoded image using the user-supplied data.

44. An automated system according to claim 43 further comprising:

an authorization server in communication with the data processor over a network, the authorization server having means for receiving an image encoding authorization request from the user data processor, second means for determining whether the user is authorized to produce an encoded image using the user-supplied data and means for transmitting an authorization approval to the user data processor responsive to a determination that the user is authorized to produce an encoded image using the user-supplied data.

45. An automated system according to claim 43 further comprising:

an authentication server in communication with the data processor over a network, the authentication server having means for carrying out at least one of the set of image encoding actions.

46. An automated system according to claim 45 wherein the authentication server includes means for receiving an image encoding authorization request from the user data processor, second means for determining whether the user is authorized to produce an encoded image using the user-supplied data and means for transmitting an authorization approval to the user data processor responsive to a determination that the user is authorized to produce an encoded image using the user-supplied data.

47. An automated system for producing encoded images for incorporation into a digital document, the system comprising:

at least one user data processor in communication with the user interface, each of the at least one user data processor being in communication with a user interface adapted for receiving user-supplied data comprising at least one of user-supplied authentication indicia and a user-supplied encoding parameter and each of the at least one user data processor being adapted for carrying out at least one of a set of image encoding actions, the set of image encoding actions including establishing a digitized authentication image, establishing an encoding parameter set including user-supplied encoding parameters, the encoding parameter set being usable to encode the digitized authentication image, and encoding the digitized authentication image using the encoding parameter set to produce a final encoded image; and a first authentication server in communication with the at least one user data processor over a first network, the first authentication server being adapted to receive a first authorization request from the at least one user data processor and to determine based on first level criteria whether the user is authorized to produce an encoded image using the user-supplied data.

48. An automated system according to claim 47 further comprising:

a second authentication server in communication with at least one of the at least one user data processor and the first authentication server over a second network, the second authentication server being adapted to receive a second authorization request, to determine based on second level criteria whether the user is authorized to produce an encoded image using the user-supplied data, and to transmit an authorization approval to at least one of the at least one user data processor and the first authentication server responsive to a determination that the user is authorized to produce an encoded image using the user-supplied data.

49. An automated system according to claim 48 wherein one of the first level criteria and the second level criteria include a limiting range on a predetermined user-supplied encoding parameter.

50. An automated system according to claim 48 wherein one of the first level criteria and the second level criteria include an image encoding software usage limit.

51. An automated system according to claim 48 wherein at least one of the first and second authentication servers is adapted to carry out at least one of the set of image encoding actions.

* * * * *